United States Patent
Ladurini et al.

(10) Patent No.: US 11,640,180 B2
(45) Date of Patent: May 2, 2023

(54) SYSTEMS AND METHODS FOR FLIGHT PATH OPTIMIZATION

(71) Applicants: Aaron R. Ladurini, Palm Bay, FL (US); Andrew W. Kom, Melbourne, FL (US); Mariska J. Absil-Mills, Melbourne, FL (US)

(72) Inventors: Aaron R. Ladurini, Palm Bay, FL (US); Andrew W. Kom, Melbourne, FL (US); Mariska J. Absil-Mills, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 173 days.

(21) Appl. No.: 17/177,652

(22) Filed: Feb. 17, 2021

(65) Prior Publication Data
US 2022/0261012 A1  Aug. 18, 2022

(51) Int. Cl.
*G05D 1/10* (2006.01)
*F02C 9/28* (2006.01)
(Continued)

(52) U.S. Cl.
CPC .............. *G05D 1/1062* (2019.05); *F02C 9/28* (2013.01); *G01W 1/10* (2013.01); *G08G 5/0039* (2013.01);
(Continued)

(58) Field of Classification Search
CPC ...... G01S 13/953; G05D 1/10; G05D 1/0278; B64C 39/024; B64C 13/16; F02G 1/043; G01W 1/10; G08G 5/0039
See application file for complete search history.

(56) References Cited

U.S. PATENT DOCUMENTS

| 10,416,678 | B2 * | 9/2019 | Sindlinger | ........... G05D 1/0278 |
| 2004/0129071 | A1 * | 7/2004 | Plaszowiecki | .......... G01W 1/10 73/170.16 |

(Continued)

FOREIGN PATENT DOCUMENTS

| CN | 109814593 A | * | 5/2019 | ............... G05D 1/10 |
| EP | 3487039 A1 | | 5/2019 | |

OTHER PUBLICATIONS

International Search Report for corresponding PCT/US2022/012157, dated Apr. 26, 2022.

*Primary Examiner* — Yuri Kan
(74) *Attorney, Agent, or Firm* — Tarolli, Sundheim, Covell & Tummino LLP

(57) ABSTRACT

Systems and methods are described herein for determining an optimized flight route for an aerial vehicle. In some examples, weather conditions for the aerial vehicle during a flight can be predicted based on weather data. At least two flight route segments based on the predicted weather data can be determined. The at least two flight route segments can include one of a solar flight route segment and a thermal flight route segment. A respective flight route segment of the at least two flight route segments can be discarded that can cause the aerial vehicle to violate a flight constraint. A replacement flight route segment for the respective discarded flight route segment can be determined. An optimized flight route for the aerial vehicle can be generated based on the replacement flight route segment and at least one remaining flight route segment of the at least two flight route segments.

16 Claims, 6 Drawing Sheets

(51) Int. Cl.
*G01W 1/10* (2006.01)
*G08G 5/00* (2006.01)
*B64C 39/02* (2023.01)
*B64U 50/34* (2023.01)

(52) U.S. Cl.
CPC ............ *B64C 39/024* (2013.01); *B64U 50/34* (2023.01); *B64U 2201/00* (2023.01)

(56) References Cited

U.S. PATENT DOCUMENTS

| | | | | |
|---|---|---|---|---|
| 2007/0252035 | A1* | 11/2007 | Hubbard, Jr. ........... | B64C 13/16 244/75.1 |
| 2013/0160451 | A1* | 6/2013 | Seifert .................... | F02G 1/043 60/682 |
| 2019/0146512 | A1* | 5/2019 | Sindlinger ............ | B64C 39/024 701/26 |

* cited by examiner

SYSTEMS AND METHODS FOR FLIGHT PATH OPTIMIZATION

TECHNICAL FIELD

The present disclosure relates to systems and methods for flight path optimization.

BACKGROUND

An airway or air route is a defined corridor that connects one location to another at a particular altitude, along which an aerial vehicle that meets a requirements of the airway may be flown high. Aircraft movements can be defined in terms of a flight path corresponding to the air route. Flight paths can change due to a wide range of variables (e.g. varying atmospheric conditions, aircraft weight, and air traffic control constraints).

Machine learning (ML) is a subset of artificial intelligence in which a computer uses algorithms and statistical models to accurately perform tasks without using explicitly coded instructions after having analyzed a learning or training data set, in effect relying on patterns and inferences to generalize from past experiences. ML-based systems can be capable of solving problems not previously seen or considered and for which it would not be possible to code for every individual case. Types of ML algorithms include, among others, supervised learning, unsupervised learning, and feature learning. Types of ML models that can be trained on the training data include artificial neural networks, decision trees, support vector machines, regression analysis models, Bayesian networks, genetic algorithms, principal components analysis, and cluster analysis.

SUMMARY

The present disclosure relates to systems and methods for flight path optimization.

In an example, a computed implemented method can include predicting weather conditions for an aerial vehicle during flight based on weather data and determining at least two flight route segments based on the predicted weather data. The at least two flight route segments can include one of a solar flight route segment and a thermal flight route segment. The computed implemented method can further include discarding a respective flight route segment of the at least two flight route segments that cause the aerial vehicle to violate a flight constraint, identifying a replacement flight route segment for the respective discarded flight route segment, and generating a flight route for the aerial vehicle based on the replacement flight route segment and at least one remaining flight route segment of the at least two flight route segments.

In another example, a system can include memory to store machine-readable instructions and data that can include user-defined flight route data characterizing a user-defined flight for an aerial vehicle. The system can include one or more processors to access the memory and execute the machine-readable instructions. The machine-readable instructions can include a route determination module and a ML library module. The router determination module can be programmed to determine flight route segments based on predicted weather conditions for the aerial vehicle during flight. The flight route segments can include a solar flight route segment and a thermal flight route segment. The router determination module can be further programmed to determine whether to discard a respective flight route segment of the flight route segments based on a flight constraint and an evaluation of a predicted engine condition relative to a predicted engine threshold, determine a replacement flight route segment in response to determining that the respective flight route segment is to be discarded based on the predicted weather conditions, and generate an optimized flight route for the aerial vehicle based on the replacement flight route segment and remaining flight route segments of the flight route segments and further based on at least one user-defined flight route segment of the user-defined flight route. The ML library module can be programmed to provide the predicted weather conditions for the aerial vehicle during flight based on current weather data. The ML library module can be further programmed to provide the predicted engine condition based on fuel data characterizing a fuel burn rate of at least one combustion engine of the aerial vehicle and electrical data characterizing a power consumption rate of at least one electrical engine of the aerial vehicle.

DETAILED DESCRIPTION

Figure 1:
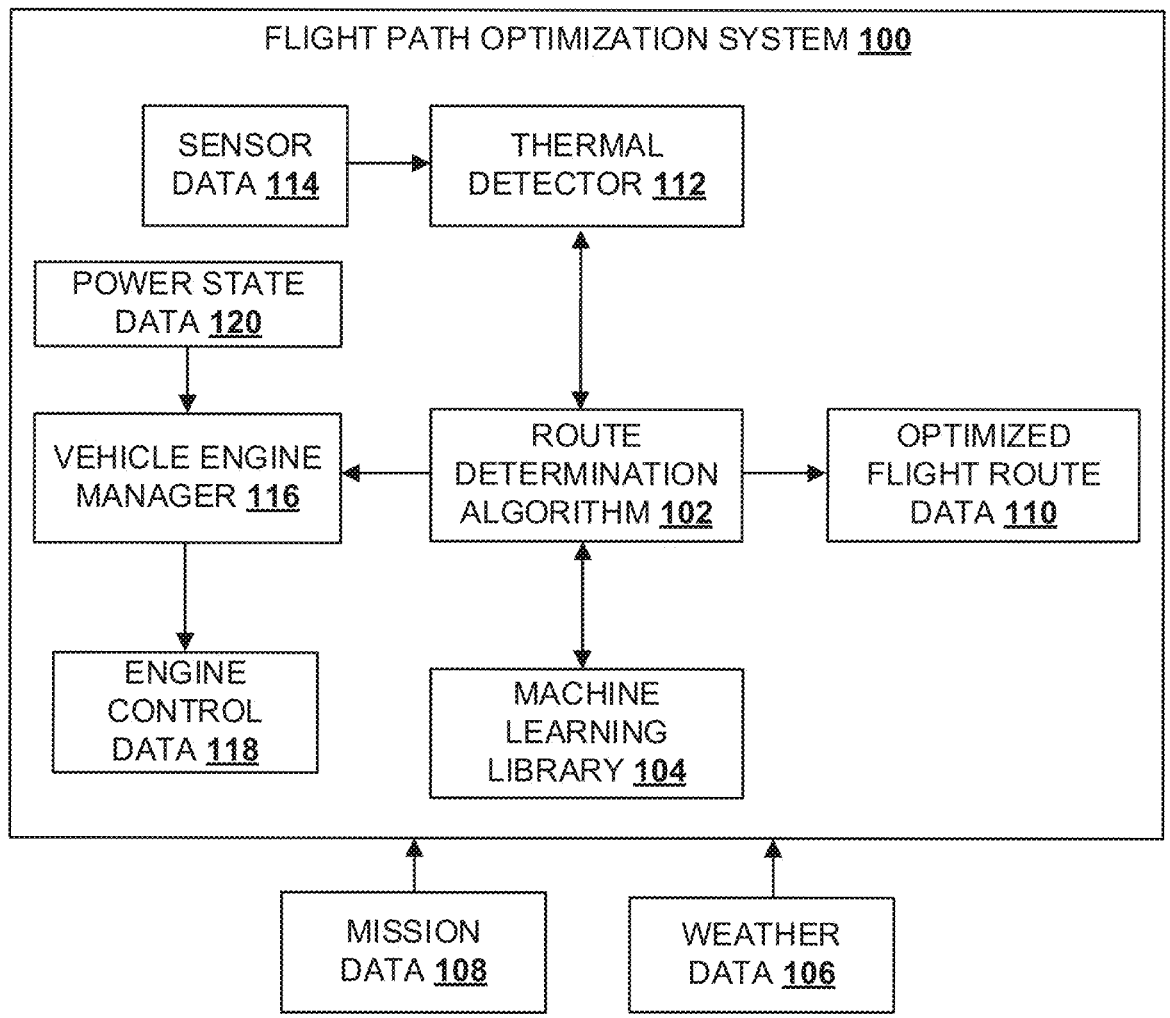
FIG. 1 is an example of a flight path optimization (FPO) system.

The present disclosure relates to systems and methods for flight path optimization. Existing techniques for defining flight defining routes for aerial vehicles are based on a flight schedule. In some instances, a flight determination algorithm is used to determine a flight path for the aerial vehicle. Existing flight determination algorithms can determine multiple pathways for the aerial vehicle, for example, to achieve or execute a mission. A select pathway can be identified for the aerial vehicle to utilize during flight, in some examples, for executing a mission. In some examples, during flight, the aerial vehicle may be configured to deviate from the selected pathway to a new pathway in response to changes in weather conditions in an atmosphere. However, the new pathway may be unfavorable as the aerial vehicle may not have sufficient fuel on board to reach a destination (e.g., point of interest) or complete the mission. In some examples, the mission may be extended or take longer than expected to be executed due to changes in the mission and/or weather conditions. The aerial vehicle may be required to abort the mission or return to a base as there may be insufficient fuel onboard the aerial vehicle to compensate for changes in the mission and/or weather conditions and allow for the aerial vehicle to reach the destination or carry out the mission.

Systems and methods are described herein that enable the aerial vehicle to evaluate weather data characterizing weather conditions and vehicle data to identify an optimized flight route for the aerial vehicle that reduces an amount of fuel consumed by the aerial vehicle to reach the destination, point of interest, or carry out the mission. By reducing the amount of fuel consumed by the aerial vehicle, the aerial vehicle can complete extended missions and identify new flight routes to complete the mission or reach the destination while reducing the amount of fuel consumed by the aerial vehicle. Thus, the systems and methods described herein can extend an amount of time the aerial vehicle is airborne while mitigating the amount of fuel needed for the aerial vehicle to remain in flight for this period of time. As such, an overall weight of the aerial can be reduced as additional fuel does not need to be stored onboard the aerial vehicle. Nor does the aerial vehicle need to be constructed from lighter materials to extend the amount of time the aerial vehicle can remain airborne, which can reduce the maneuverability of the aerial vehicle in windy conditions.

Moreover, the systems and methods described herein enable the aerial vehicle to leverage favorable weather conditions such as thermal and solar conditions to recharge a battery of the aerial vehicle for powering onboard systems of the vehicle. The charge store at the battery can be used to power one or more electrical engines of the aerial vehicle configured to generate thrust and thus enable the aerial vehicle to maneuver in the atmosphere. Thereby the amount of fuel consumed by the aerial vehicle can be reduced by employing the electrical engines which reduces an overall operational costs of the aerial vehicle. The systems and methods described here can leverage ML techniques to evaluate the weather data and vehicle data to determine the optimized flight route for the aerial vehicle. The systems and methods escribes use ML to examine atmospheric conditions to determine a flight route that conserves and leverages energy efficiencies to increase flight time (e.g., a mission duration). By defining a power and energy regeneration ability of the aerial vehicle, the systems and methods described herein can delineate an optimal flight route for the aerial vehicle for reaching the destination or completing the mission.

For example, the aerial vehicle can be configured with a FPO system. A route determination algorithm of the FPO system can be configured to determine an optimized flight route for the aerial vehicle that does not violate a flight constraint (e.g., a flight time constraint). The route determination algorithm can be configured to communicate with an ML library of the FPO system. The ML library can be configured to predict weather conditions that the aerial vehicle is likely to experience during flight based on the weather data, in some examples, based on mission data characterizing the mission for the aerial vehicle. The route determination algorithm can be configured to receive the predicted weather conditions for generating the optimized flight route. The route determination algorithm can be configured to determine flight route segments based on the predicted weather conditions. The flight route segments can include at least one of a solar flight route segment, a thermal flight route segment, or a fuel usage flight route segment. In some examples, the route determination algorithm can be configured to determine the optimized flight route based a user-defined flight route and at least one determined flight route segment.

In some examples, the route determination algorithm can be configured to associate each flight route segment of the flight route segments with at least one other flight route segment of the flight route segments to provide the optimized flight route for the aerial vehicle. In some examples, the route determination algorithm can be configured to evaluate the optimized flight route or an at least partially constructed initial flight route to determine whether the optimized flight route violates the flight constraint. For example, the route determination algorithm can be configured to discard (e.g., ignore) a respective flight route segment that violates the flight constraint or causes the optimized flight route to violate the flight constraint. In some examples, the route determination algorithm can be configured to determine a new flight route segment for replacing the discarded respective flight route segment for generating the optimized flight route.

In some examples, the route determination algorithm can be configured to discard the solar flight route segment based on a predicted power consumption of the electrical engines of the aerial vehicle during the solar flight route segment. The predicted power consumption of electrical engines of the aerial vehicle can be provided by the ML library. In some examples, the route determination algorithm can be configured to discard the solar flight route segment based on a predicted fuel burn rate of combustion engines of the aerial vehicle during the solar flight route segment. The predicted fuel burn rate of the aerial vehicle can be provided by the ML library. In some examples, the route determination algorithm can be configured to discard the solar flight route segment based on a predicted battery depletion rate of the battery of the aerial vehicle during the solar flight route segment. The predicted battery depletion rate of the battery of the aerial vehicle can be provided by the ML library. In some examples, the route determination algorithm can be configured to discard the thermal flight route segment based a predicted power generation rate of an electrical generator during the thermal flight route segment. The power generation rate of the electrical generator can be predicted by the ML library. In some examples, the route determination algorithm can be configured to include the fuel usage flight route segment as part of the optimized flight path in response to determining that no alternative flight route segment along which the aerial vehicle can be maneuvered that allow for solar or active regeneration. In some examples, the route determination algorithm can be configured to discard the fuel usage flight route segment based on the predicted fuel burn rate of the aerial vehicle during the fuel usage flight route segment.

In some examples, the route determination algorithm can be configured to combine the solar flight route segment, the thermal flight route segment, and/or the fuel usage flight route segment, and in some examples, at least one flight route segment from the user-defined flight route, to generate the optimized flight route for the aerial vehicle. The optimized flight route can be provided to a vehicle control system to cause or enable the aerial vehicle to be maneuvered along the optimized flight route to reach the destination and/or complete the mission.

In some examples, the route determination algorithm can be configured to communicate with a vehicle engine manager of the FPO system. The vehicle engine manager can be configured to control an operational state of the combustion and/or electrical engines of the aerial vehicle. Thus, the vehicle engine manager can be configured to cause the combustion and/or electrical engines of the aerial vehicle to be enabled (e.g., turned-on) or disabled (e.g., turned-off) during maneuvering of the aerial vehicle along the optimized flight route. The vehicle engine manager can be configured to generate engine control data to control the operational state of the combustion and/or electrical engines during each flight route segment of the optimized flight route. In some examples, the vehicle engine manager can be configured to determine a respective power state for the aerial vehicle for each flight route segment of the optimized flight route based on power state data. The power state data can characterize different power states for the aerial vehicle and each power state can be associated (e.g., flagged or tagged) with a respective flight route segment of the optimized flight route.

Each power state for the aerial vehicle can be associated with an operational state of each of the combustion and/or electrical engines of the aerial vehicle. Thus, the power state data can control a power state of the aerial vehicle. Accordingly, the vehicle engine manager can be configured to cause the aerial vehicle to operate in the respective power state for the respective flight route segment of the optimized flight route based on the power state data. For example, the vehicle engine manager can be configured to generate the engine control data based on a respective power state of the power state data. The engine control data can be provided to the vehicle control system to cause the aerial vehicle to operate in the respective power state.

FIG. 1 is an example of a FPO system 100. The FPO system 100 can be implemented on an aerial vehicle. The aerial vehicle can be a manned aerial vehicle or an unmanned aerial vehicle (UAV), such as a drone. In some examples, the aerial vehicle is configured to implement a mission (e.g., a reconnaissance mission). The FPO system 100 can enable a flight route to be determined for the aerial vehicle that mitigates or reduces an amount of fuel consumed by the aerial vehicle. Furthermore, in some examples, the FPO system 100 enables the aerial vehicle to take an advantages of areas in an atmosphere that provide favorable solar exposure for the aerial vehicle and/or enable the aerial vehicle to take advantage of thermal drafts in the atmosphere. The illustrated components of the FPO system 100 represent software components (e.g., machine readable instructions and data) that are stored in a non-transitory memory and executed by a processor. For simplicity, hardware components, including the non-transitory memory and the processor are omitted from FIG. 1, and included in a subsequent Figure, (FIG. 2) with additional detail.

In some examples, the FPO system 100 includes a route determination algorithm 102. The route determination algorithm 102 can be configured to determine an optimized flight route for the aerial vehicle that does not violate a flight constraint (e.g., a flight time constraint). The route determination algorithm 102 can be configured to communicate with a ML library 104. The ML library 104 can be configured to predict weather conditions that the aerial vehicle is likely to experience during flight based on weather data 106 characterizing current weather conditions, and in some examples, based on mission data 108. The mission data 108 can characterize one or more tasks and/or objectives of the mission that are to be implemented by the aerial vehicle during the mission. In some examples, the mission data 208 can include one or more mission constraints (e.g., a mission flight time constraint).

The route determination algorithm 102 can be configured to receive the predicted weather conditions from the ML library 104 for generating the optimized flight route. The route determination algorithm 102 can be configured to determine at least one flight route segment for generating the optimized flight route. The flight route segment can correspond to or can be representative of an air pathway in the atmosphere that can be used by the aerial vehicle during flight, in some examples, for executing the mission. Each flight route segment can be characterized by or associated with location information (e.g., global positioning system (GPS) coordinates) that can be employed by the aerial vehicle to maneuver the aerial vehicle along the flight route segment. A respective flight route segment determined by the route determination algorithm 102 can be used to form the optimized flight route in response to determining the respective flight route segment does not violate the flight constraint. Example flight route segments that can be determined by the route determination algorithm 102 can include a solar flight route segment, a thermal flight route segment, and a fuel usage flight route segment.

In some examples, the route determination algorithm 102 can be further configured to provide the optimized flight route based on a user-defined flight route. In some examples, the route determination algorithm 102 can be configured to deconstruct or identify a user-defined flight route segments of the user-defined flight route. The route determination algorithm 102 can be configured to provide the optimized flight route based on at least one user-defined flight route segment and at least one of the solar flight route segment, the thermal flight route segment, and the fuel usage flight route segment. For example, to provide the optimized flight route, the route determination algorithm 102 can be configured to associate each flight route segment of the flight route segments with at least one other flight route segment of the flight route segments to provide or identify the optimized flight route for the aerial vehicle. In some examples, at least some of the flight route segments for constructing the optimized flight route can be the at least one user-defined flight route segment.

In some examples, the route determination algorithm 102 can be configured to evaluate the optimized flight route or an at least partially constructed optimized flight route to determine whether the flight constraint has been violated. The route determination algorithm 102 can be configured to identify (e.g., tag or flag) the respective flight route segment that causes the flight constraint to be violated. For example, the route determination algorithm 102 can be configured to discard (e.g., ignore) the respective flight route segment that violates the flight constraint or causes the optimized flight route or an at least partially constructed optimized flight route to violate the constraint. In some examples, the route determination algorithm 102 can be configured to determine a new flight route segment for replacing the discarded respective flight route segment for generating the optimized flight route.

In some examples, the route determination algorithm 102 can be configured to determine the respective flight route segment for providing the optimized flight path based on predicted and/or forecasted data provided by the ML library 104. For example, the route determination algorithm 102 can be configured to determine the solar flight route segment for the aerial vehicle based on the predicted weather data provided by the ML library 104 and in some examples the mission data 108. The solar flight route segment can correspond to or be representative of an air path in the atmosphere that can be used by the aerial vehicle during flight, in some examples, executing the mission that increases a likelihood that the aerial vehicle can be exposed to a solar source. Thus, in some examples, the aerial vehicle can be configured with a solar power system. By increasing the likelihood that the aerial vehicle is exposed to the solar source enables the solar power system to provide electrical energy based on captured solar energy to charge a battery on the aerial vehicle. The battery can be configured to power onboard systems of the aerial vehicle. In some examples, the aerial vehicle is configured with combustion and electrical engines. The battery can be coupled to an electrical generator of the aerial vehicle to power the electrical engines.

In some examples, the ML library 104 can be trained to predict weather conditions that the aerial vehicle can experience during flight, in some examples, during the execution of the mission. In some examples, the ML library 104 can be configured to predict the weather conditions further based on the mission data 108. The predicted weather conditions can include cloud coverage, precipitation, a wind speed, a thermal draft (e.g., up and/or down thermal drafts), a wind temperature, and/or a wind direction. In some examples, the route determination algorithm 102 can be configured to evaluate the solar flight segment to determine whether the solar flight route segment is to be included as part of the optimized flight path or to be discarded. In some examples, the route determination algorithm 102 can be configured discard the solar flight route segment in response to determining that a predicted power consumption of the electrical engines of the aerial vehicle that are to be used during the solar flight route segment would be greater than or equal to a power consumption threshold. The power consumption of the electrical engines of the aerial vehicle can be predicted by the ML library 104.

In some examples, the route determination algorithm 102 can be configured to discard the solar flight route segment in response to determining that a predicted fuel burn rate of the combustion engines of the aerial vehicle for a respective period of time during the solar flight route segment is greater than or equal to a fuel burn rate threshold. The predicted fuel burn rate of the combustion engines can be predicted by the ML library 104. In some examples, the route determination algorithm 102 can be configured to discard the solar flight route segment in response to determining that a predicted battery depletion rate of the battery of the aerial vehicle for the respective period of time during the solar flight route segment is greater than or equal to a battery depletion rate threshold. The battery depletion rate of the battery of the aerial vehicle can be predicted by the ML library 104.

In some examples, the route determination algorithm 102 can be configured to compute the thermal flight route segment for generating the initial optimized flight route. The thermal flight route segment can correspond to or be representative of an air path in the atmosphere that can be used by the aerial vehicle during flight, in some examples, executing the mission that increases a likelihood that the aerial vehicle can be exposed to the thermal draft. The thermal draft can be used to enable the aerial vehicle to increase an altitude of the aerial vehicle and/or enable the aerial vehicle to store the electrical energy generated by the electrical generator at the battery in response to the thermal draft as described herein. By using the thermal draft to increase the altitude of the aerial vehicle can reduce an amount of fuel consumed by the aerial vehicle as the combustion engines do not need to be used to gain altitude. Moreover, by using the thermal draft to generate the electrical energy, the battery can be replenished with an electrical charge, and/or the one or more onboard systems of the aerial vehicle can be supplied with power.

The route determination algorithm 102 can be configured to determine the thermal flight route segment for generating the optimized flight route based on the mission data 108 and/or the predicted weather data provided by the ML library 104. In some examples, the route determination algorithm 102 can be configured to determine the thermal flight route segment for the aerial vehicle based on the current weather data 106, which can include location information (e.g., GPS coordinates) for the at least one thermal draft. The route determination algorithm 102 can be configured to evaluate the thermal flight route segment to determine whether the thermal flight route segment is to be included as part of the optimized flight route or to be discarded. In some examples, the route determination algorithm 102 can be configured to discard the thermal flight route segment in response to determining that a predicted power generation rate of the electrical generator for a respective period of time during the thermal flight route segment would be less than or equal to a power generation threshold. The power generation rate of the electrical generator for the respective period of time during the thermal flight route segment can be predicted by the ML library 104.

In some examples, the route determination algorithm 102 can be configured to determine the fuel usage flight route segment for generating the optimized flight route. The fuel usage flight route segment can correspond to or be representative of an air path in the atmosphere that can be used by the aerial vehicle during flight, in some executing the mission, during which the combustion engines of the aerial vehicle burn fuel at or below the fuel burn rate threshold. By identifying the respective flight route segment during which the aerial vehicle is not caused to burn fuel excessively can reduce an overall fuel consumption rate of the aerial vehicle. The route determination algorithm 102 can be configured to determine the fuel usage flight route segment based on the weather data 106, and in some examples, based on the mission data 108. For example, the route determination algorithm 102 can be configured to identify (e.g., flag or tag) the respective flight route segment as the fuel usage flight route segment in response to determining that the weather conditions along the respective flight route segment are favorable (e.g., the aerial vehicle experiences less drag, for example, resulting from a headwind or a crosswind in contrast to another flight route segment).

In some examples, the route determination algorithm 102 can be configured to evaluate the fuel usage flight route segment to determine whether the fuel usage flight route segment is to be included as part of the optimized flight route or to be discarded. In some examples, the route determination algorithm 102 can be configured to include the fuel usage flight route segment as part of the optimized flight path in response to determining that no alternative flight route segment along which the aerial vehicle can be maneuvered using solar or active regeneration techniques exists. Thus, in some examples, if no solar flight route segment or thermal flight segment is determined by the route determination algorithm 102 as an alternative flight route segment, the route determination algorithm 102 can be configured to use the fuel usage flight route segment as part of the optimized flight path. In some examples, the route determination algorithm 102 can be configured to discard the fuel usage flight route segment in response to determining that maneuvering the aerial vehicle along the fuel usage flight route segment is likely to burn an elevated amount of fuel based on the predicted fuel burn rate of the combustion engines of the aerial vehicle for a respective period of time along the fuel usage flight route segment. As described herein, the route determination algorithm 102 can be configured to communicate with the ML library 104. The ML library 104 can be configured to predict the fuel burn rate of the aerial vehicle for the respective period of time along the fuel usage flight route segment. The route determination algorithm 102 can be configured to discard the fuel usage flight route segment in response to determining that the combustion engines are likely to burn the elevated amount of fuel based on the predicted fuel burn rate of the aerial vehicle for the respective period of time along the fuel usage flight route segment.

In some examples, the route determination algorithm 102 can be configured to combine the solar flight route segment, the thermal flight route segment, and/or the fuel usage flight route segment to generate the optimized flight route for the aerial vehicle (e.g., for example for executing the mission). In some examples, the fuel usage flight route segment can correspond to a respective user-defined flight route segment of the user-defined flight route for the aerial vehicle. The optimized flight route for the aerial vehicle can be stored in the memory as or part of optimized flight route data 110. The optimized flight route data 110 can be provided to a vehicle control system to cause or enable the aerial vehicle to be maneuvered along the optimized flight route.

In some examples, during the flight of the aerial vehicle along the optimized flight route, the route determination algorithm 102 can be configured to communicate with a thermal detector 112. While the example of FIG. 1 illustrates the thermal detector 112 separate from the route determination algorithm 102, in other examples the route determination algorithm 102 can include the thermal detector 112. The thermal detector 112 can be configured to cause the aerial vehicle to search for thermal drafts in the atmosphere. Thus, in some examples, the aerial vehicle can be configured to investigate detected thermal drafts to determine whether the thermal draft is a favorable thermal draft or an unfavorable thermal draft. A favorable thermal draft is a thermal draft with an amount of strength (e.g., wind force) that can cause the aerial vehicle to increase a given amount in altitude and/or to enable the aerial vehicle to recharge the battery on-board the aerial vehicle and thus not use the combustion engines. An unfavorable thermal draft is a thermal draft that does not have sufficient strength to cause the aerial vehicle to increase the given amount in altitude and/or enable the aerial vehicle to recharge the battery on-board the aerial vehicle.

For example, the thermal detector 112 can be configured to cause one or more sensor systems of the aerial vehicle to scan for thermal events in the atmosphere to detect the thermal draft. The one or more sensor systems can include an imaging system, a radar system, and/or a lidar system. The one or more systems can be configured to generate sensor data 114. The sensor data 114 can be received or retrieved by the thermal detector 112. The imaging, radar, and/or lidar systems can be configured to generate image, radar, and/or lidar data characterizing an area or a location in the atmosphere. The image, radar, and/or lidar data can correspond to the sensor data 114, as shown in FIG. 1.

The thermal detector 112 can be configured to cause the electrical generator of the aerial vehicle to enter a power generating mode in response to determining that the aerial vehicle is located at the location in the atmosphere at which the thermal draft is located. During the power generating mode, the electrical generator can store electrical energy at the battery in response to the thermal draft. For example, the thermal draft can cause the propellers of the aerial vehicle to rotate. Because the electrical generator is coupled to the propellers of the aerial vehicle through the electrical engine, the thermal draft can cause the electrical generator to generate the electrical energy. The electrical energy can be stored in the battery and/or provided to the onboard systems of the aerial vehicle. In some examples, the thermal detector 112 can be configured to detect the thermal draft and generate thermal draft location data for the detected thermal draft based on the sensor data 114. For example, the thermal detector 112 can be configured to communicate with the vehicle control system of the aerial vehicle to receive aerial vehicle location data (e.g., GPS coordinates) for the aerial vehicle, and employ the aerial vehicle location data to estimate a location of the detected thermal draft in the atmosphere based on the sensor data 114. The estimated location can correspond to or form part of the thermal draft location data.

In some examples, the thermal detector 112 can be configured to provide thermal draft location data for the thermal draft to the route determination algorithm 102. The route determination algorithm 102 can be configured to determine a respective flight route segment for modifying the current flight route to investigate whether the detected thermal draft is a favorable or unfavorable thermal draft. The route determination algorithm 102 can be configured to modify the current flight route in response to determining that investigation of the detected thermal draft would not violate the flight constraint (e.g., the mission time constraint). The modified current flight route can be used to maneuver the aerial vehicle in the atmosphere to the estimated location of the detected thermal draft for investigation of whether the detected thermal draft is favorable or unfavorable.

For example, the thermal detector 112 can be configured to evaluate a rate at which the aerial vehicle is caused to increase a respective altitude in response to the detected thermal draft relative to an altitude rate threshold. The thermal detector 112 can be configured to identify (e.g., flag or tag) the detected thermal draft as a favorable thermal draft or an unfavorable thermal draft based on the evaluation of rate at which the aerial vehicle is caused to increase the respective altitude in response to the detected thermal draft and the altitude rate threshold. In some examples, the thermal detector 112 can be configured to evaluate the amount of electrical power that is caused to be generated by the electrical generator in response to the detected thermal draft relative to a thermal electrical power generation threshold. The thermal detector 112 can be configured to identify the detected thermal draft as the favorable thermal draft or as the unfavorable thermal draft based on evaluation of the amount of electrical power that is caused to be generated by the electrical generator in response to the detected thermal draft and the thermal electrical power generation threshold. The thermal detector 112 can be configured to generate thermal draft data identifying each favorable and unfavorable thermal draft and location information (e.g., GPS coordinates) of each thermal draft. The thermal draft data can be employed by the route determination algorithm 102 for future flight route optimizations for the aerial vehicles. In some examples, the thermal detector 112 can be configured to cause the thermal draft data to be communicated to a remote station (e.g., the control station) or to one or more other aerial vehicles, which can employ the thermal draft data for flight route optimization in a same or similar manner as described herein.

In some examples, the route determination algorithm 102 can be configured to communicate with a vehicle engine manager 116. The vehicle engine manager 116 can be configured to control an operational state of the combustion and/or electrical engines of the aerial vehicle. Thus, the vehicle engine manager 116 can be configured to cause the combustion and/or electrical engines of the aerial vehicle to be enabled (e.g., turned-on) or disabled (e.g., turned-off) during maneuvering of the aerial vehicle along the optimized flight route. The vehicle engine manager 116 can be configured to generate engine control data 118 to control the operational state of the combustion and/or electrical engines during each flight route segment of the optimized flight route.

In some examples, the vehicle engine manager 116 can be configured to determine a respective power state for the aerial vehicle for each flight route segment of the optimized flight route based on power state data 120. The power state data 120 can characterize different power states for the aerial vehicle and each power state can be associated (e.g., flagged or tagged) with the respective flight route segment of the optimized flight route. Each power state for the aerial vehicle can be associated with an operational state of each of the combustion and/or electrical engines of the aerial vehicle and the association can be stored as part of the power state data 120. Thus, the power state data 120 can control a power state of the aerial vehicle. By way of example, the different power states can include a first power state, a second power state, a third power state, a fourth power state, a fifth power state, and a sixth power state. The vehicle engine manager 116 can be configured to cause the aerial vehicle to operate in the respective power state (e.g., one of the first, second, third, fourth, fifth, or sixth power states) for the respective flight route segment of the current route based on the power state data 120.

For example, the vehicle engine manager 116 can be configured to generate the engine control data 118 based on a respective power state of the power state data 120. The engine control data 118 can be provided to the flight control to cause the aerial vehicle to operate in the respective power state. Thus, the vehicle engine manager 116 can be configured to cause the aerial vehicle to operate in the respective state. For example, the vehicle engine manager 116 can be configured to cause the aerial vehicle to operate in the first power state during which the combustion engines are enabled and supplied with the fuel stored on the aerial vehicle. In some examples, the vehicle engine manager 116 can be configured to cause the aerial vehicle to operate in the second power state during which the combustion engines are disabled and the electrical engines of the aerial vehicle are enabled and supplied with the electrical energy stored at the battery of the aerial vehicle.

In some examples, the vehicle engine manager 116 can be configured to cause the aerial vehicle to operate in the third power state during which the combustion engines are enabled and suppled with the fuel stored on the aerial vehicle, and the electrical engines of the aerial vehicle are enabled and supplied with the electrical energy stored at the battery of the aerial vehicle. In some examples, the vehicle engine manager 116 can be configured to cause the aerial vehicle to operate in the fourth power state during which a single combustion engine of the aerial vehicle is enabled and provided with fuel stored on the aerial vehicle. In some examples, the vehicle engine manager 116 can be configured to can be configured to cause the aerial vehicle to operate in the fifth power state during which a single electrical engine of the aerial vehicle is enabled and supplied with the electrical energy from the battery of the aerial vehicle. In some examples, the vehicle engine manager 116 can be configured to cause the aerial vehicle to operate in the sixth power state during which the combustion and electrical engines are disabled. For example, the aerial vehicle can be caused to operate in the sixth power state in response to be located in the atmosphere at which the thermal draft is located. The thermal draft can be exploited by the aerial vehicle as described herein to increase the altitude of the aerial vehicle.

Accordingly, the FPO system 100 can be employed to determine an optimized flight route for the aerial vehicle that leverages solar and thermal pathways in the atmosphere to reduce fuel consumption of the aerial vehicle to reach a destination and/or complete the mission. Because the FPO system 100 employs ML techniques for predicting weather conditions enables the aerial vehicle to respond to changes in weather conditions and increases the amount of time that the aerial vehicle is airborne while reducing the amount of fuel that is consumed by the aerial vehicle to remain airborne. Additionally, the FPO system 100 can be configured to determine unique power states (e.g., power usage and power generation) for the aerial vehicle to use for each respective flight route segment of the optimized flight route to implement the mission (e.g. the objectives and/or tasks of the mission).

By employing the FPO system 100 on the aerial vehicle improves a performance of the aerial vehicle by enabling the aerial vehicle to leverage atmospheric conditions to generate the electrical energy for powering onboard systems and/or the electrical engines. Moreover, configuring the aerial vehicle with the FPO system 100 reduces the operating costs of the aerial vehicle as less fuel needs to be consumed by the aerial vehicle during flight. Additionally, configuring the aerial vehicle with the FPO system 100 allows for detection of favorable thermal drafts in the atmosphere, which can be employed by the aerial in subsequent flights or provided to other aerial vehicles to enable the other aerial vehicles to take advantage of the favorable thermal drafts during flight.

Figure 2:
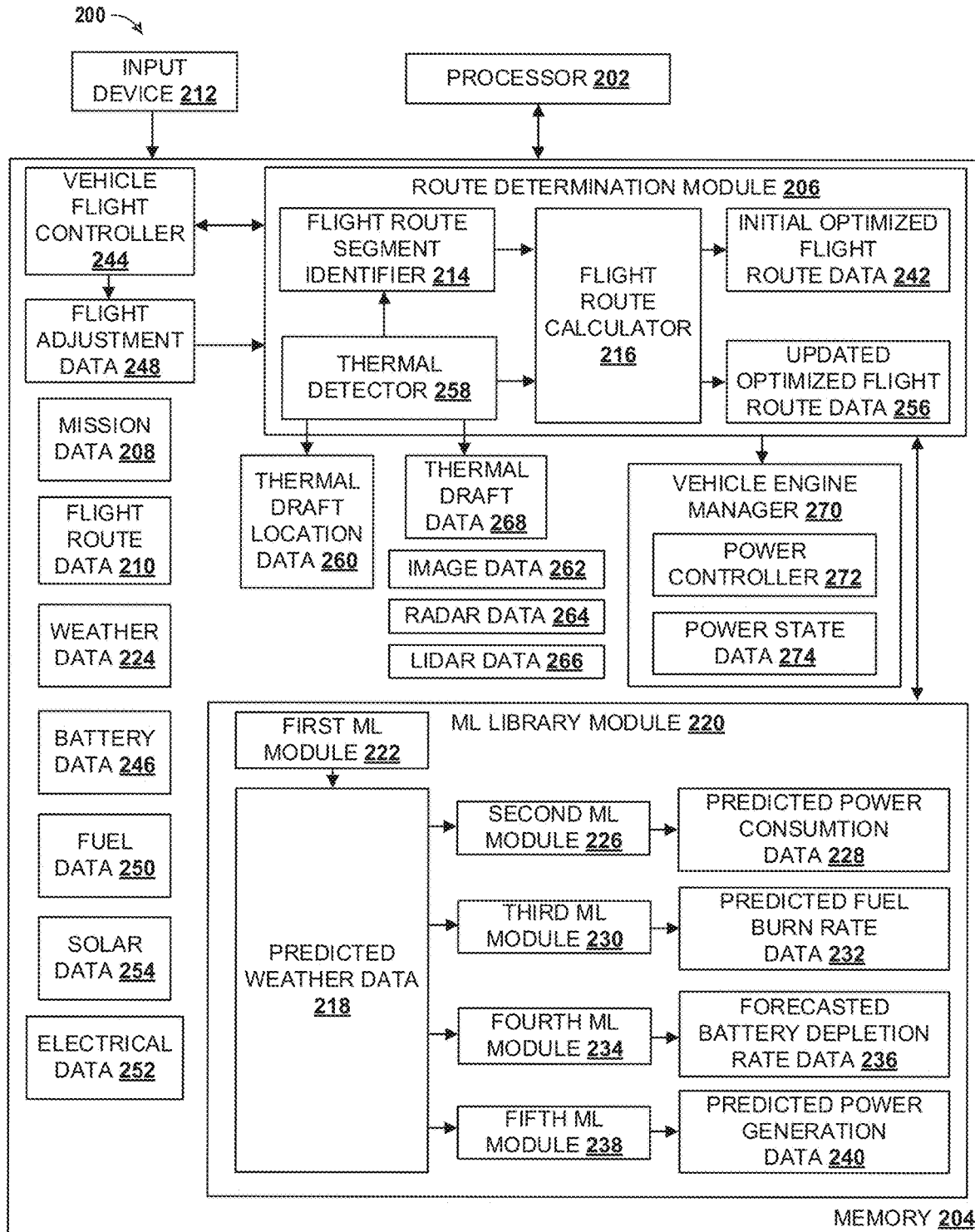
FIG. 2 is an example of another FPO system.

FIG. 2 is an example of another FPO system 200. The FPO system 200 can be implemented on an aerial vehicle. The FPO system 200 can include one or more processors 202 and a memory 204. The one or more processors 202 can access the memory 204 and execute the machine readable instructions stored therein to implement one or more functions as described herein. The memory 204 can be implemented as volatile memory (e.g., random access memory) and/or non-volatile memory (e.g., a solid-state drive, a hard disk drive, flash memory, and the like).

The memory 204 can include a route determination module 206. In some examples, the route determination module 206 can correspond to the route determination algorithm 102, as shown in FIG. 1. Thus, the following description of FIG. 2 can also refer to FIG. 1. The route determination module 206 can be programmed to determine an initial optimized flight route for the aerial vehicle that does not violate a flight constraint. A flight route that has been optimized for the aerial vehicle as used herein can refer to a pathway in an atmosphere that enables the aerial vehicle to take advantage of a thermal draft in the atmosphere or increases an amount of time that the aerial vehicle is exposed to a solar source (e.g., in contrast, the amount of time that the aerial vehicle is exposed to a solar source (e.g., a Sun) along the user-defined flight route for the aerial vehicle). In some examples, the initial optimized flight route can be determined while the aerial vehicle is grounded. In some examples, the initial flight route can be determined before an execution of a mission. In some examples, the flight constraint includes one or more mission constraints for the mission for execution by the aerial vehicle. In some examples, the route determination module 206 can be programmed to adjust a user-defined flight route for the aerial vehicle to provide an initial optimized flight route for the aerial vehicle.

In some examples, the route determination module 206 can be programmed to optimize the user-defined flight route for the aerial vehicle to provide the initial optimized flight route for the aerial vehicle based on mission data 208 and flight route data 210. The mission data 208 can correspond to the mission data 108 as shown in FIG. 1. The mission data 208 can characterize one or more tasks and/or objectives of the mission that are to be implemented by the aerial vehicle. In some examples, the mission data 208 can include the one or more mission constraints. For example, the one or more mission constraints can include one or more timing constraints, which can be associated with the tasks and/or objectives. In some examples, the one or more timing constraints can include an overall mission time for implementing the mission. The flight route data 210 can characterize the user-defined flight route for the aerial vehicle and can be associated with the mission data 208. In some examples, the mission data 208 and the flight route data 210 can be provided based on a user input at an input device 212 (e.g., such as a computer). In some examples, the input device 212 can be part of the FPO system 200, and thus can be implemented on the aerial vehicle (e.g., can be located in a cockpit in examples wherein the aerial vehicle is manned). In other examples, the input device 212 can be located at a remote location, such as a control station, which can be configured to communicate the flight route data 210 and the mission data 208 using a communication medium (e.g., a wired and/or wireless communication medium).

In some examples, the route determination module 206 includes a flight route segment identifier 214. The flight route segment identifier 214 can be programmed to determine a flight route segment. A respective flight route segment determined by the flight route segment identifier 214 can be used to form the initial optimized flight route in response to determining the respective flight route segment does not violate the flight constraint. Example flight route segments can include a solar flight route segment, a thermal flight route segment, and a fuel usage flight route segment.

In some examples, the flight route segment identifier 214 can be programmed to provide the respective flight segment to a flight route calculator 216 of the route determination module 206. The flight route calculator 216 can be programmed to modify the user-defined flight route to provide the initial optimized flight route or, in some examples, determine the initial optimized flight route based on the identified flight route segment. In some examples, the flight route calculator 216 can be programmed to generate (e.g., construct) the initial optimized flight route for the aerial vehicle based on flight route segments. The flight route segments can include at least one of the solar, thermal, and fuel usage flight route segments. The flight route calculator 216 can be programmed to associate each flight route segment of the flight route segments with at least one other flight route segment of the flight route segments to provide the initial optimized flight route.

In some examples, at least some of the flight route segments can be provided by the flight route segment identifier 214 as described herein. In additional or alternative examples, at least some of the flight route segments for constructing the initial optimized flight route can be extracted from the user-defined flight route by the flight route segment identifier 214 or the flight route calculator 216. By way of example, the flight route segment identifier 214 or the flight route calculator 216 can be programmed to process the user-defined flight route to identify user-defined flight segments that form the user-defined flight route. In some examples, the flight route data 210 can include information identifying each user-defined flight route segment. In other examples, the flight route segment identifier 214 or the flight route calculator 216 can be programmed to evaluate the user-defined flight route to identify the user-defined flight segments.

In some examples, the flight route calculator 216 can be programmed to evaluate the initial optimized flight route or an at least partially constructed initial optimized flight route to determine whether the optimized flight route violates the flight constraint. By way of example, if the flight constraint specifies a flight time constraint for the aerial vehicle (e.g., for completing the mission), and the initial optimized flight route or the at least partially constructed initial optimized flight route would cause the aerial vehicle to exceed a flight time for the aerial vehicle, the flight route calculator 216 can be programmed to identify (e.g., tag or flag) the respective flight route segment that causes the flight constraint to be violated. For example, the flight route calculator 216 can be programmed to discard (e.g., ignore) the respective flight route segment that violates the flight constraint. For each flight route segment, the flight route calculator 216 can be programmed to compute (e.g., estimate) an amount of time for maneuvering the aerial vehicle along the respective flight route segment.

In some examples, the flight route calculator 216 can be programmed to compute the estimated amount of time for each respective flight route segment based on at least predicted weather data 218. The flight route calculator 216 can be programmed to identify (e.g., tag or flag) the respective flight route segment that causes the flight constraint to be violated. For example, the flight route calculator 216 can be programmed to discard (e.g., ignore) the respective flight route segment and communicate with the flight route segment identifier 214 for a replacement flight route segment. In some examples, the flight route calculator 216 can be programmed to communicate with the flight route segment identifier 214 to request a new flight route segment for replacing the discarded respective flight route segment. The flight route calculator 216 can be programmed to process the new flight route segment in a same or a similar manner as the respective flight route segment as described herein for generating the initial optimized flight route.

In some examples, the flight route segment identifier 214 can be programmed to determine the flight route segment for providing the initial optimized flight path by the flight route calculator 216 based on predicted and/or forecasted data. As described herein, the predicted and forecasted data can be provided by an ML library module 220 in the memory 204. In some examples, the ML library module 220 can correspond to the ML library 104, as shown in FIG. 1. For example, the flight route segment identifier 214 can be programmed to determine the solar flight route segment for the aerial vehicle based on predicted weather data 218. The solar flight route segment can correspond to or be representative of an air path in the atmosphere that can be used by the aerial vehicle during flight, in some examples, executing the mission that increases a likelihood that the aerial vehicle can be exposed to the solar source. By increasing the likelihood that the aerial vehicle is exposed to the solar source enables the aerial vehicle to recharge a battery on-board the aerial vehicle.

In some examples, the aerial vehicle can include a solar power system that can be configured to capture solar energy from the solar source. In some examples, the solar power system can include one or more solar panels to capture the solar energy from the solar source. The solar power system can be configured to convert the captured solar energy to electrical energy. The solar power system can be coupled to the battery of the vehicle and to enable the electrical energy produced by the solar power system to be stored at the battery. The battery can be coupled to an electrical generator that is coupled to electrical engines of the aerial vehicle. The electrical energy stored at the battery can be used to powering one or more onboard systems of the aerial vehicle and to provide power to the electrical generator. By way of example, the one or more onboard systems can include a RADAR system, a LIDAR system, a flight control system, a mission system, and/or any system that consumes electrical energy and thus power. The electrical engines can be coupled to at least one propeller of the aerial vehicle and can cause the at least one propeller to generate thrust to maneuver the aerial vehicle based on the electrical energy provided by the electrical generator. In some examples, the aerial vehicle includes combustion engines. The combustion engines can be configured to generate the thrust to maneuver the aerial vehicle by consuming fuel (e.g., a fossil fuel) stored at a fuel tank of the aerial vehicle. In some examples, the aerial vehicle includes an electrical generator. During favorable weather conditions as described herein, the at least one propeller of the aerial vehicle can be configured to rotate which can cause the electrical generator to produce electrical energy. The electrical energy produced by the electrical generator can be stored in the battery and used to power the one or more onboard systems of the aerial vehicle.

In some examples, the flight route segment identifier 214 can be programmed to determine the solar flight route segment based on predicted weather data 218 and the mission data 208. The flight route segment identifier 214 can communicate with a first ML module 222 of the ML library module 220 to receive or retrieve the predicted weather data 218. The first ML module 222 can be trained to predict weather conditions that the aerial vehicle can experience during flight, in some examples, during the execution of the mission. For example, the first ML module 222 can be programmed to predict weather conditions during execution of the mission by the aerial vehicle based on current weather data 224 (e.g., provided by onboard weather sensors of the aerial vehicle and/or from a control station) and/or the flight route data 210. In some examples, the first ML module 222 can be programmed to predict the weather conditions further based on the mission data 208. The predicted weather conditions can include cloud coverage, a precipitation, a wind speed, a thermal draft (e.g., up and/or down thermal drafts), a wind temperature, and/or a wind direction. In some examples, the first ML module 222 can be programmed to predict a solar energy collection rate for the solar flight route segment. The predicted solar energy collection rate can characterize a rate at which the solar power system of the aerial vehicle is likely to collect solar energy from the source. For example, the flight route segment identifier 214 can be programmed to flag or tag the respective flight route segment as the solar flight route segment in response to determining that the predicted solar energy collection rate is greater than or equal to a solar energy collection rate threshold. The predicted solar energy collection rate can be stored in the memory as part of the predicted weather data 218.

In some examples, the flight route segment identifier 214 can be programmed to provide the solar flight route segment to the flight route calculator 216. The flight route calculator 216 can be programmed to evaluate the solar flight segment to determine whether the solar flight route segment is to be included as part of the optimized initial flight path or to be discarded. In some examples, the flight route calculator 216 can be programmed to discard the solar flight route segment in response to determining that a predicted power consumption of the electrical engines of the aerial vehicle that is to be used during the solar flight route segment would be greater than or equal to a power consumption threshold. The power consumption of the electrical engines of the aerial vehicle employing during the solar flight route segment can be predicted by the ML library module 220 for the determination of whether to discard the solar flight route segment by the flight route calculator 216.

For example, to predict the power consumption of the electrical engines of the aerial vehicle employed during the solar flight route segment, the flight route calculator 216 can be programmed to communicate with a second ML module 226 of the ML library module 220. The second ML module 226 can be trained to predict an amount of power consumed by the electrical engines of the aerial vehicle along a respective flight route segment (e.g., the solar flight route segment) based on the predicted weather data 218. By way of example, the second ML module 226 can be programmed to predict the amount of power consumed (e.g., drawn) by the electrical engines of the aerial vehicle as the aerial vehicle maneuvers along the respective flight route segment. The second ML module 226 can be programmed to generate predicted power consumption data 228 characterizing the predicted amount of power that is likely to be consumed by the electrical engines during the respective flight route segment, such as the solar flight route segment. In some examples, the flight route calculator 216 can be programmed to discard the solar flight route segment based on the predicted power consumption data 228. For example, the flight route calculator 216 can be programmed to discard the solar flight route segment in response to determining that the predicted amount of power that is likely to be consumed by the electrical engines during the solar flight route segment is greater than or equal to the power consumption threshold.

In some examples, the flight route calculator 216 can be programmed to discard the solar flight route segment in response to determining that a predicted fuel burn rate of the aerial vehicle for a period of time during the solar flight route segment is greater than or equal to a first fuel burn rate threshold. The fuel burn rate of the aerial vehicle for the period of time during the solar flight route segment can be predicted for the determination of whether to discard the solar flight route segment by the ML library module 220. For example, to predict the fuel burn rate of the combustion engines of the aerial vehicle for the period of time during the solar flight route segment, the flight route calculator 216 can be programmed to communicate with a third ML module 230 of the ML library module 220.

The third ML module 230 can be trained to predict a fuel burn rate of the aerial vehicle for the period of time along the respective flight route segment (e.g., the solar flight route segment) based on the predicted weather data 218. For example, the third ML module 230 can be programmed to predict an amount of fuel that is likely to be burnt (e.g., consumed) by the combustion engines of the aerial vehicle over the period of time along the respective flight route segment. The third ML module 230 can be programmed to generate predicted fuel burn rate data 232 characterizing the predicted fuel burn rate of the aerial vehicle over the period of time along the respective flight route segment. The flight route calculator 216 can be programmed to discard the solar flight route segment based on the predicted fuel burn rate data 232. For example, the flight route calculator 216 can be programmed to discard the solar flight route segment in response to determining that the predicted fuel burn rate of the aerial vehicle for the period of time along the respective flight route segment would be greater than or equal to the first fuel burn rate threshold.

In some examples, the flight route calculator 216 can be programmed to discard the solar flight route segment in response to determining that a predicted battery depletion rate of the battery of the aerial vehicle for the period of time during the solar flight route segment is greater than or equal to a battery depletion rate threshold. The battery depletion rate of the aerial vehicle for the period of time during the solar flight route segment can be predicted for the determination of whether to discard the solar flight route segment. For example, to predict the battery depletion rate of the battery of the aerial vehicle for the period of time during the solar flight route segment, the flight route calculator 216 208 can be programmed to communicate with a fourth ML module 234 of the ML library module 220.

The fourth ML module 234 can be trained to forecast a battery depletion rate of the battery of the aerial vehicle for the period of time along the respective flight route segment (e.g., the solar flight route segment) based on the predicted weather data 218. The fourth ML module 234 can be programmed to generate forecasted battery depletion rate data 236 characterizing the battery depletion rate of the battery of the aerial vehicle over the period of time along the respective flight route segment. The flight route calculator 216 can be programmed to discard the solar flight route segment based on the forecasted battery depletion rate data 236. For example, the flight route calculator 216 can be programmed to discard the solar flight route segment in response to determining that the forecasted battery depletion rate of the battery of the aerial vehicle for the period of time along the respective flight route segment would be greater than or equal to the battery depletion rate threshold.

In some examples, the flight route segment identifier 214 can be programmed to determine the thermal flight route segment for use by the flight route calculator 216 in generating the initial optimized flight route. The thermal flight route segment can correspond to or be representative of an air path in the atmosphere that can be used by the aerial vehicle during flight, in some examples, executing the mission that increases a likelihood that the aerial vehicle can be exposed to the thermal draft. The thermal draft can be used to enable the aerial vehicle to increase an altitude of the aerial vehicle and/or enable the aerial vehicle to store the electrical energy generated by the electrical generator at the battery in response to the thermal draft as described herein. By using the thermal draft to increase the altitude of the aerial vehicle can reduce an amount of fuel consumed by the aerial vehicle as the combustion engines do not need to be used to gain altitude. Moreover, by using the thermal draft to generate the electrical energy, the battery can be replenished with an electrical charge, and/or the one or more onboard systems of the aerial vehicle can be powered.

The flight route segment identifier 214 can be programmed to identify the thermal flight route segment based on the mission data 208 and/or the predicted weather data 218. In some examples, the flight route segment identifier 214 can be programmed to identify the thermal flight route segment based on the current weather data 224, which can include location information (e.g., GPS coordinates) for the at least one thermal draft. The flight route segment identifier 214 can be programmed to communicate the thermal flight route segment to the flight route calculator 216. The flight route calculator 216 can be programmed to evaluate the thermal flight route segment to determine whether the thermal flight route segment is to be included as part of the optimized initial flight path or to be discarded. In some examples, the flight route calculator 216 can be programmed to discard the thermal flight route segment in response to determining that a predicted power generation rate of the electrical generator for a period of time during the thermal flight route segment would be less than or equal to a power generation threshold. The power generation rate of the electrical generator for the period of time during the thermal flight route segment can be predicted by the ML library module 220 for the determination of whether to discard the thermal flight route segment.

For example, to predict the power generation rate of the electrical generator for the period of time during the thermal flight route segment, the flight route calculator 216 can be programmed to communicate with a fifth ML module 238 of the ML library module 220. The fifth ML module 238 can be trained to predict an amount of power that is likely to be generated by the electrical generator of the aerial vehicle for the period of time as the aerial vehicle is maneuvered along the thermal flight route segment based on the predicted weather data 218. For example, the fifth ML module 238 can be programmed to predict the amount of power that is likely to be generated by the electrical generator of the aerial vehicle for the period of time as the aerial vehicle is maneuvered along the thermal flight route segment in response to the thermal draft.

The fifth ML module 238 can be programmed to generate predicted power generation data 240 characterizing the predicted amount of power that is likely to be generated by the electrical generator of the aerial vehicle for the period of time during the respective flight route segment (e.g., the thermal flight route segment) in response to the thermal draft. The flight route calculator 216 can be programmed to discard the thermal flight route segment based on the predicted power generation data 240. For example, the flight route calculator 216 can be programmed to discard the thermal flight route segment in response to determining that the predicted power generation rate of the electrical generator for the period of time during the thermal flight route segment would be less than or equal to the power generation threshold.

In some examples, the flight route segment identifier 214 can be programmed to determine the fuel usage flight route segment for use by the flight route calculator 216 in generating the initial optimized flight route. The fuel usage flight route segment can correspond to or be representative of an air path in the atmosphere that can be used by the aerial vehicle during flight, in some executing the mission, during which the combustion engines of the aerial vehicle burn fuel at or below the fuel burn rate threshold. By identifying the respective flight route segment during which the aerial vehicle is not caused to burn fuel excessively can reduce an overall fuel consumption rate of the aerial vehicle. The flight route segment identifier 214 can be programmed to identify the fuel usage flight route segment based on the predicted weather data 218 and the mission data 208. For example, the flight route segment identifier 214 can be programmed to identify (e.g., flag or tag) a respective flight route segment as the fuel usage flight route segment in response to determining that weather conditions along the respective flight route segment are favorable (e.g., the aerial vehicle experiences less drag, for example, resulting from a headwind or a crosswind).

In some examples, the flight route segment identifier 214 can be programmed to provide the fuel usage flight route segment to the flight route calculator 216. The flight route calculator 216 can be programmed to evaluate the fuel usage flight route segment to determine whether the fuel usage flight route segment is to be included as part of the optimized initial flight path or to be discarded. In some examples, the flight route calculator 216 can be programmed to include the fuel usage flight route segment as part of the optimized initial flight path in response to determining that no alternative flight route segment along which the aerial vehicle can be maneuvered using solar or active regeneration techniques exists. Thus, in some examples, if no solar flight route segment or thermal flight segment is determined by the flight route segment identifier 214 as an alternative flight route segment, the flight route calculator 216 can be programmed to include the fuel usage flight route segment as part of the optimized initial flight path.

In some examples, the flight route calculator 216 can be programmed to discard the fuel usage flight route segment in response to determining that maneuvering the aerial vehicle along the fuel usage flight route segment is likely to burn an elevated amount of fuel. For example, the flight route calculator 216 can be programmed to discard the fuel usage flight route segment in response to determining that a predicted fuel burn rate of the aerial vehicle for a period of time along the fuel usage flight route segment is greater than or equal to a second fuel burn rate threshold. In some examples, the second fuel burn rate threshold is equal to the first fuel burn rate threshold. As described herein, the flight route calculator 216 can be programmed to communicate with the third ML module 230. The third ML module 230 can be programmed to predict the fuel burn rate of the aerial vehicle for the period of time along the fuel usage flight route segment. The flight route calculator 216 can be programmed to discard the fuel usage flight route segment based on the predicted fuel burn rate data 232 for the period of time during which the aerial vehicle is maneuvered along the fuel usage flight route segment. For example, the flight route calculator 216 can be programmed to discard the fuel usage flight route segment in response to determining that the predicted fuel burn rate of the aerial vehicle for the period of time along the fuel usage flight route segment would be greater than or equal to the second fuel burn rate threshold.

In some examples, the flight route calculator 216 can be programmed to combine the solar flight route segment, a thermal flight route segment, and/or the fuel usage flight route segment to generate the initial optimized flight route for the aerial vehicle (e.g., for example for executing the mission). In some examples, the fuel usage flight route segment can correspond to a respective flight route segment of the user-defined flight route segments of the user-defined flight route for the aerial vehicle. The initial optimized flight route for the aerial vehicle can be stored in the memory 204 as or part of initial optimized flight route data 242. The initial optimized flight route data 242 can be provided to a sub-system of the aerial vehicle, such as a flight control system (e.g., a navigation system) to cause or enable the aerial vehicle to be maneuvered along the initial optimized flight route.

In some examples, as the aerial vehicle is underway (e.g., flying) along the initial optimized flight route, a vehicle flight controller 244 can be employed for updating the initial optimized flight route. For example, the vehicle flight controller 244 can be programmed to receive battery data 246. The battery data 246 can be generated by an on-board battery monitoring system on the vehicle. The battery data 246 can characterize a battery charge status of the battery of the vehicle, a battery health of the battery of the vehicle, a battery depletion rate, and/or a battery recharge rate. In some examples, the fourth ML module 234 can be programmed to generate the forecasted battery depletion rate data 236 based on the battery data 246. The vehicle flight controller 244 can be programmed to evaluate the battery data 246 to determine whether the initial optimized flight route is to be updated (e.g., re-optimized). In some examples, the vehicle flight controller 244 can be programmed to communicate with the flight route calculator 216 to update the initial flight route in response to determining that the battery depletion rate exceeds the battery recharge rate. For example, the battery depletion rate can exceed the battery recharge rate during unfavorable weather conditions. By way of example, the aerial vehicle can experience a drag, for example, resulting from a headwind or a crosswind that causes the aerial vehicle to deplete the battery at a greater rate than the battery can be recharged.

In some examples, the vehicle flight controller 244 can be programmed to generate the flight adjustment data 248 in response to determining that the battery depletion rate exceeds the battery recharge rate. In some examples, the vehicle flight controller 244 can be programmed to generate the flight adjustment data 248 in response to determining that the battery charge status and/or battery health is less than or equal to a battery charge status threshold and/or battery health threshold, respectively. The flight adjustment data 248 can be generated based on battery information (and in some examples relative to a corresponding threshold) and can be indicative of a request to update the initial optimized flight route for the aerial vehicle, such that the aerial vehicle is maneuvered along the solar flight route segment or the thermal flight route segment.

In some examples, the vehicle flight controller 244 can be programmed to generate the flight adjustment data 248 based on updated weather data (e.g., provided by the on-board weather sensors of the aerial vehicle and/or from the control station). For example, vehicle flight controller 244 can be programmed to receive the updated weather data and evaluate the updated weather data to determine whether the aerial vehicle is to experience an unfavorable weather condition (e.g., a strong wind, a gust, cloud coverage, low to none solar exposure, such as during nighttime, etc.) flying along the respective flight route segment of the initial optimized flight route. The flight adjustment data 248 generated based on updated weather data can be indicative of a request to update the initial optimized flight route for the aerial vehicle, such that the aerial vehicle is maneuvered along the solar flight route segment or the thermal flight route segment.

In some examples, the vehicle flight controller 244 can be programmed to generate flight adjustment data 248 in response to determining that a fuel burn rate of the combustion engines of the vehicle during flight along the respective flight route segment of the initial optimized flight route exceeds one of the first and second fuel burn rate thresholds. For example, the vehicle flight controller 244 can be programmed to receive or retrieve fuel data 250. The fuel data 250 can be generated by an on-board fuel monitoring system of the aerial vehicle. The fuel data 250 can characterize an amount of fuel onboard the aerial vehicle and the fuel burn rate of the vehicle during flight along the respective flight route segment of the initial optimized flight route. In some examples, the third ML module 230 can be programmed to generate the predicted fuel burn rate data 232 based on the fuel data 250.

In some examples, the vehicle flight controller 244 can be programmed to generate the flight adjustment data 248 in response to determining that the fuel burn rate of the vehicle during flight along the respective flight route segment of the initial optimized flight route exceeds a third fuel burn rate threshold. In some examples, the third fuel burn rate threshold can be similar to one of the first or the second fuel burn rate thresholds. The flight adjustment data 248 generated based on the fuel burn rate of the vehicle during flight along the respective flight route segment can be indicative of a request to update the initial optimized flight route for the aerial vehicle, such that the aerial vehicle is maneuvered along the solar flight route segment or the thermal flight route segment.

In some examples, the fuel data 250 can indicate an aerial re-fueling location for the aerial vehicle. The vehicle flight controller 244 can be programmed to generate the flight adjustment data 248 in response to determining that the aerial vehicle is within a distance of the aerial refueling location for the aerial vehicle and the maneuvering of the aerial vehicle for refueling at the aerial refueling location does not violate the flight constraint. The flight adjustment data 248 generated based on an evaluation of the aerial refueling location can be indicative of a request to update the initial optimized flight route for the aerial vehicle, such that the aerial vehicle is maneuvered along the solar flight route segment, the thermal flight route segment, or the fuel usage flight route segment toward the aerial refueling location for the aerial vehicle. In some examples, the flight adjustment data 248 can include the refueling location for the aerial vehicle.

In some examples, the vehicle flight controller 244 can be programmed to generate flight adjustment data 248 in response to determining that the amount of power consumed by the electrical engines during flight along the respective flight route segment of the initial optimized flight route is greater than or equal to the power consumption threshold or a second power consumption threshold. For example, the vehicle flight controller 244 can be programmed to receive or retrieve electrical data 252. The electrical data 252 can be generated by an on-board electrical generator monitoring system of the aerial vehicle. The electrical data 252 can characterize the amount of power consumed by the electrical engines during flight along the respective flight route segment of the initial optimized flight route. In some examples, the second ML module 226 can be programmed to generate the predicted power consumption data 228 based on the electrical data 252. The flight adjustment data 248 generated based on the amount of power consumed by the electrical engines during flight along the respective flight route segment of the initial optimized flight route can be indicative of a request to update the initial optimized flight route for the aerial vehicle, such that the aerial vehicle is maneuvered along the solar flight route segment or the thermal flight route segment.

In some examples, the vehicle flight controller 244 can be programmed to generate flight adjustment data 248 in response to determining that the amount of power generated by the electrical generator during flight along the respective flight route segment of the initial optimized flight route is greater than or equal to the power generation threshold or a different power generation threshold. In some examples, the electrical data 252 can characterize the amount of power generated by the electrical generator during flight along the respective flight route segment of the initial optimized flight route. The flight adjustment data 248 generated based on the amount of power generated by the electrical generator during flight along the respective flight route segment of the initial optimized flight route can be indicative of a request to update the initial optimized flight route for the aerial vehicle, such that the aerial vehicle is maneuvered along the solar flight route segment or the fuel usage flight route segment.

In some examples, the vehicle flight controller 244 can be programmed to generate flight adjustment data 248 in response to determining that the amount of electrical power produced by the solar power system of the aerial vehicle during flight along the respective flight route segment of the initial optimized flight route is less than or equal to a solar power generation threshold. For example, the vehicle flight controller 244 can be programmed to receive or retrieve solar data 254. The solar data 254 can be generated by an on-board solar monitoring system of the aerial vehicle. The solar data 254 can characterize the amount of electrical power being produced by the solar power system of the aerial vehicle. The flight adjustment data 248 generated based on the amount of electrical power produced by the solar power system of the aerial vehicle during flight along the respective flight route segment of the initial optimized flight route can be indicative of a request to update the initial optimized flight route for the aerial vehicle, such that the aerial vehicle is maneuvered along the flight usage flight route segment or the thermal flight route segment.

The vehicle flight controller 244 can be programmed to communicate the flight adjustment data 248 to the route determination module 206 to update the initial optimized flight plan, such that the aerial vehicle is maneuvered along a new flight route segment. By way of example, the new flight route segment can correspond to the solar flight route segment, the thermal flight route segment, or the fuel usage flight route segment. The flight route segment identifier 214 can be programmed to identify the new flight route segment in a same or a similar as described herein. The flight route calculator 216 can be programmed to determine (e.g., calculate) an updated optimized flight route that includes the new flight route segment for the aerial vehicle to be maneuvered along in a same or similar manner as described herein. The flight route calculator 216 can be programmed to determine the updated optimized flight route that includes the new flight route segment for the aerial vehicle that does not violate the flight constraint in a same or similar manner as described herein. The flight route calculator 216 can be programmed to store in the memory 204 the updated optimized flight plan as or part of updated optimized flight route data 256

In some examples, during the flight of the aerial vehicle along a current flight route (e.g., the initial optimized flight route or the updated optimized flight route), the route determination module 206 can be programmed to detect or search for thermal drafts in the atmosphere in response to determining that deviation from the current flight route does not violate the flight constraint (e.g., the mission flight time for completing the mission). Thus, in some examples, the aerial vehicle can be configured to investigate detected thermal drafts to determine whether the thermal draft is a favorable thermal draft or an unfavorable thermal draft.

In some examples, the route determination module 206 can include a thermal detector 258 that can be programmed to detect the thermal draft in the atmosphere. The thermal detector 258 can correspond to the thermal detector 112, as shown in FIG. 1. The thermal detector 258 can be configured to cause the electrical generator of the aerial vehicle to enter a power generating mode in response to determining that the aerial vehicle is located at a location in the atmosphere at which a respective thermal draft is located. The thermal draft can cause the propellers of the aerial vehicle to rotate. Because the electrical generator is coupled to the propellers of the aerial vehicle through the electrical engine, the thermal draft can cause the electrical generator to generate the electrical energy. The electrical energy can be stored in the battery and/or provided to one or more onboard systems of the aerial vehicle.

In some examples, the thermal detector 258 can be programmed to detect the thermal draft and generate thermal draft location data 260 for the detected thermal draft based on image data 262, radar data 264, and/or lidar data 266. For example, the thermal detector 258 can be programmed to communicate with the flight control system of the aerial vehicle to receive aerial vehicle location data (e.g., GPS coordinates) for the aerial vehicle, and employ the aerial vehicle location data to estimate a location of the detected thermal draft in the atmosphere based on the image data 262, radar data 264, and/or lidar data 266. The estimated location can correspond to or form part of the thermal draft location data 260.

By way of example, the image data 262 can be generated by an imaging system (e.g., one or more cameras) of the aerial vehicle. The image data 262 can characterize a surface of Earth. The thermal detector 258 can be programmed to evaluate the image data 262 to identify dark areas present on the surface of the Earth (e.g., on a parking lot, a plowed field, etc.) corresponding to detected thermal draft. The thermal detector 258 can be programmed to determine a distance between an identified dark area and the aerial vehicle. The thermal detector 258 can be programmed to estimate the location of the detected thermal draft in the atmosphere based on the identified dark area. The thermal detector 258 can be programmed to estimate the location of the detected thermal draft in the atmosphere based on the determined distance and the aerial vehicle location data.

In some examples, the radar data 264 can be generated by a radar system of the aerial vehicle. In some examples, the radar system of the aerial vehicle can be configured as a Pulse-Doppler radar system. The radar system can be configured to emit a radar signal (e.g., one or more electromagnetic (EM) waves) toward airborne particles that are located at a similar location as the thermal draft. The airborne particles can change a frequency of the radar signal and reflect the radar signal back toward the one or more radar systems as a reflected radar signal. The radar system can be configured to provide the radar data 264 characterizing the emitted radar signal and the reflected radar signal. The thermal detector 258 can be programmed to evaluate the radar data 264 to detect the thermal draft.

The airborne particles can be caused to move in response to a wind force of a wind produced by gas-particle movement in the atmosphere. A movement of the gas particles can be caused by a spatial difference in atmospheric pressure in the atmosphere and can produce the thermal draft, such as a columnar thermal draft. For example, a warm air draft corresponding to the wind force of the wind can be produced to cause the airborne particles to move vertically with respect to the surface of the Earth. The airborne particles can be of any size and have any shape. The term "airborne particles" as used herein can include dust, water, snow, rain, aerosols, dirt, trash, objects, insects, or particles that may be moved in response to the wind force produced by the wind. The thermal detector 258 can be programmed to evaluate the radar data 264 to detect the movement of the airborne particles in response to the wind force of the wind. The thermal detector 258 can be programmed to determine a distance between the airborne particles and the aerial vehicle. The thermal detector 258 can be programmed to estimate the location of the detected thermal draft in the atmosphere based on the determined distance and the aerial vehicle location data.

In some examples, the lidar data 266 can be generated by a lidar system of the aerial vehicle. The lidar system can include one or more lidar sensors (e.g., laser scanners) that can be configured to emit laser pulses at the airborne particles and detect a portion of the emitted laser pulses as back-scattered light as the emitted laser pulses interact with the airborne particles being acted on by the wind force of the wind corresponding to the thermal draft. The thermal detector 258 can be programmed to evaluate the lidar data 266 to detect the movement of the airborne particles in response to the wind force of the wind corresponding to detecting the thermal draft. The thermal detector 258 can be programmed to determine a distance between the airborne particles and the aerial vehicle. The thermal detector 258 can be programmed to estimate the location of the detected thermal draft in the atmosphere based on the determined distance and the aerial vehicle location data.

The thermal detector 258 can be programmed to generate the thermal draft location data 260 for the detected thermal draft characterizing the estimated location of the respective thermal draft. In some examples, the thermal detector 258 can be programmed to provide thermal draft location data 260 for the thermal draft to the flight route segment identifier 214. The flight route segment identifier 214 can be programmed to determine a respective flight route segment for modifying the current flight route to investigate whether the detected thermal draft is a favorable or unfavorable thermal draft. The respective flight route segment can be provided to the flight route calculator 216 for investigation of detected thermal draft. The flight route calculator 216 can be programmed to modify (e.g., update) the current flight route in response to determining that investigation of the detected thermal draft would not violate the one or more flight constraints (e.g., the mission time constraint). The modified current flight route can be used to maneuver the aerial vehicle in the atmosphere to the estimated location of the detected thermal draft.

In some examples, the detected thermal draft can be evaluated to determine whether the detected thermal draft is a favorable or an unfavorable thermal draft. For example, the thermal detector 258 can be programmed to evaluate a rate at which the aerial vehicle is caused to increase a respective altitude in response to the detected thermal draft relative to an altitude rate threshold. The thermal detector 258 can be programmed to flag or tag the detected thermal draft as a favorable thermal draft in response to determining that the rate at which the aerial vehicle is caused to increase the respective altitude is equal to or greater than the altitude rate threshold. The thermal detector 258 can be programmed to flag or tag the detected thermal draft as an unfavorable thermal draft in response to determining that the rate at which the aerial vehicle is caused to increase the respective altitude is less than the altitude rate threshold.

In some examples, the thermal detector 258 can be programmed to evaluate the amount of electrical power that is caused to be generated by the electrical generator in response to the detected thermal draft relative to a thermal electrical power generation threshold. The thermal detector 258 can be programmed to flag or tag the detected thermal draft as the favorable thermal draft in response to determining that the amount of electrical power that is caused to be generated by the electrical generator in response to the detected thermal draft is greater than or equal to the thermal electrical power generation threshold. In some examples, the thermal detector 258 can be programmed to flag or tag the detected thermal draft as the unfavorable thermal draft in response to determining that the amount of electrical power that is caused to be generated by the electrical generator in response to the detected thermal draft is less than the thermal electrical power generation threshold.

The thermal detector 258 can be programmed to generate thermal draft data 268 identifying each favorable and unfavorable thermal draft and location information (e.g., GPS coordinates) of each thermal draft. The thermal draft data 268 can be stored in the memory 204 and employed by the flight route segment identifier 214 for future flight of the aerial vehicles (e.g., such as future missions). In some examples, the thermal detector 258 can be programmed to cause the thermal draft data 268 to be communicated to a remote station (e.g., the control station) or to one or more other aerial vehicles, which can employ the thermal draft data 268 for flight route optimization in a same or similar manner as described herein.

In some examples, the memory 204 can include a vehicle engine manager 270. The vehicle engine manager 270 can be programmed to control an operational state of the aerial vehicle to enable (e.g., turn-on) and disable (e.g., turn-off) the combustion engines and/or the electrical engines of the aerial vehicle during maneuvering of the aerial vehicle along the current flight route. The vehicle engine manager 270 can include a power state controller 272. The power state controller 272 can be programmed to receive current flight route data (e.g., one of the initial optimized flight route data 242 or the updated optimized flight route data 256) from the route determination module 206. The power state controller 272 can be programmed to identify respective flight route segments of the current flight route based on the current flight route data. In some examples, the current flight route data can include information classifying each flight route segment (e.g., the solar flight route segment, the thermal flight route segment, or the fuel usage flight route segment) of the current flight route. Thus, each respective flight route segment can be associated with information identifying whether the respective flight route segment is a solar flight route segment, a thermal flight route segment, or a fuel usage flight route segment.

In some examples, the power state controller 272 can be programmed to determine a respective power state for the aerial vehicle for each flight route segment of the current route based on power state data 274. The power state data 274 can correspond to the power state data 120, as shown in FIG. 1. The power state controller 272 can be programmed to cause the aerial vehicle to operate in the respective power state (e.g., one of the first, second, third, fourth, fifth, or sixth power states as described herein) for the respective flight route segment of the current route based on the power state data 274. The power state controller 272 can be programmed to generate engine control data (e.g., such as the engine control data 118, as shown in FIG. 1) to control the operational state of the combustion and/or electrical engines during each flight route segment of the optimized flight route.

For example, the power state controller 272 can be programmed to cause the aerial vehicle to operate in the first power state during which the combustion engines are enabled and powered by the fuel stored on the aerial vehicle. During the first power state, the electrical generator can be driven by the combustion engines to generate the electrical energy, which can be stored in the battery of the aerial vehicle. In some examples, during the first power state, the solar power system of the aerial vehicle can be configured to provide the electrical energy for storage at the battery of the aerial vehicle. In some examples, the power state controller 272 can be programmed to cause the aerial vehicle to operate in the second power state during which the combustion engines are disabled and the electrical engines of the aerial vehicle are enabled and powered by the battery of the aerial vehicle. In some examples, during the second power state, the solar power system of the aerial vehicle can be config-ured to provide electrical energy for storage at the battery of the aerial vehicle based on captured solar energy from the solar source.

In some examples, the power state controller 272 can be programmed to cause the aerial vehicle to operate in the third power state during which the combustion engines are enabled and suppled with the fuel stored on the aerial vehicle, and the electrical engines of the aerial vehicle are enabled and supplied with the electrical energy stored at the battery of the aerial vehicle. During the third power state, the electrical generator can be driven by the combustion engines to generate the electrical power for storage in the battery of the aerial vehicle. In some examples, during the third power state, the solar power system of the aerial vehicle can be configured to provide electrical energy for storage in the battery of the aerial vehicle based on captured solar energy from the solar source.

In some examples, the power state controller 272 can be programmed to cause the aerial vehicle to operate in the fourth power state during which a single combustion engine of the aerial vehicle is enabled and provided with fuel stored on the aerial vehicle. During the fourth power state, a remaining combustion engine and the electrical engines are disabled. During the fourth power state, the electrical generator can be driven by the single combustion engine to generate the electrical energy for storage in the battery of the aerial vehicle. In some examples, during the fourth power state, the solar power system of the aerial vehicle can be configured to provide electrical energy for storage at the battery of the aerial vehicle based on captured solar energy from the solar source. In some examples, the power state controller 272 can be programmed to cause the aerial vehicle to operate in the fifth power state during which a single electrical engine of the aerial vehicle is enabled and supplied with the electrical energy from the battery of the aerial vehicle. During the fifth power state, a remaining electrical engine and the combustion engines are disabled. In some examples, during the fifth power state, the electrical generator can be driven (e.g., in response to the thermal draft) to generate the electrical energy for storage at the battery of the aerial vehicle. In some examples, during the fifth power state, the solar power system of the aerial vehicle can be configured to provide electrical energy for storage at the battery of the aerial vehicle based on captured solar energy from the solar source.

In some examples, the power state controller 272 can be programmed to cause the aerial vehicle to operate in the sixth power state during which the combustion and electrical engines are disabled. For example, the aerial vehicle can be caused to operate in the sixth power state in response to be located in the atmosphere at which the respective thermal draft is located. The respective thermal draft can be used to increase the altitude of the aerial vehicle. In some examples, during the sixth power state, the electrical generator can be driven (e.g., in response to the thermal draft) to generate the electrical energy for storage at the battery of the aerial vehicle. In some examples, during the sixth power state, the solar power system of the aerial vehicle can be configured to provide electrical energy for storage at the battery of the aerial vehicle based on captured solar energy from the solar source.

Accordingly, the FPO system 200 can be employed to determine an optimized flight route for the aerial vehicle that leverages solar and thermal pathways in the atmosphere to reduce fuel consumption of the aerial vehicle to reach a destination and/or complete the mission. Because the FPO system 200 employs ML techniques for predicting weather conditions enables the aerial vehicle to respond to changes in weather conditions and increases the amount of time that the aerial vehicle is airborne while reducing the amount of fuel that is consumed by the aerial vehicle to remain airborne. Additionally, the FPO system 200 can be configured to determine unique power states (e.g., power usage and power generation) for the aerial vehicle to use for each respective flight route segment of the optimized flight route to implement the mission (e.g. the objectives and/or tasks of the mission).

By employing the FPO system 200 on the aerial vehicle improves a performance of the aerial vehicle by enabling the aerial vehicle to leverage atmospheric conditions to generate the electrical energy for powering onboard systems and/or the electrical engines. Moreover, configuring the aerial vehicle with the FPO system 200 reduces the operating costs of the aerial vehicle as less fuel needs to be consumed by the aerial vehicle during flight. Additionally, configuring the aerial vehicle with the FPO system 200 allows for detection of favorable thermal drafts in the atmosphere, which can be employed by the aerial in subsequent flights or provided to other aerial vehicles to enable the other aerial vehicles to take advantage of the favorable thermal drafts during flight.

Figure 3:
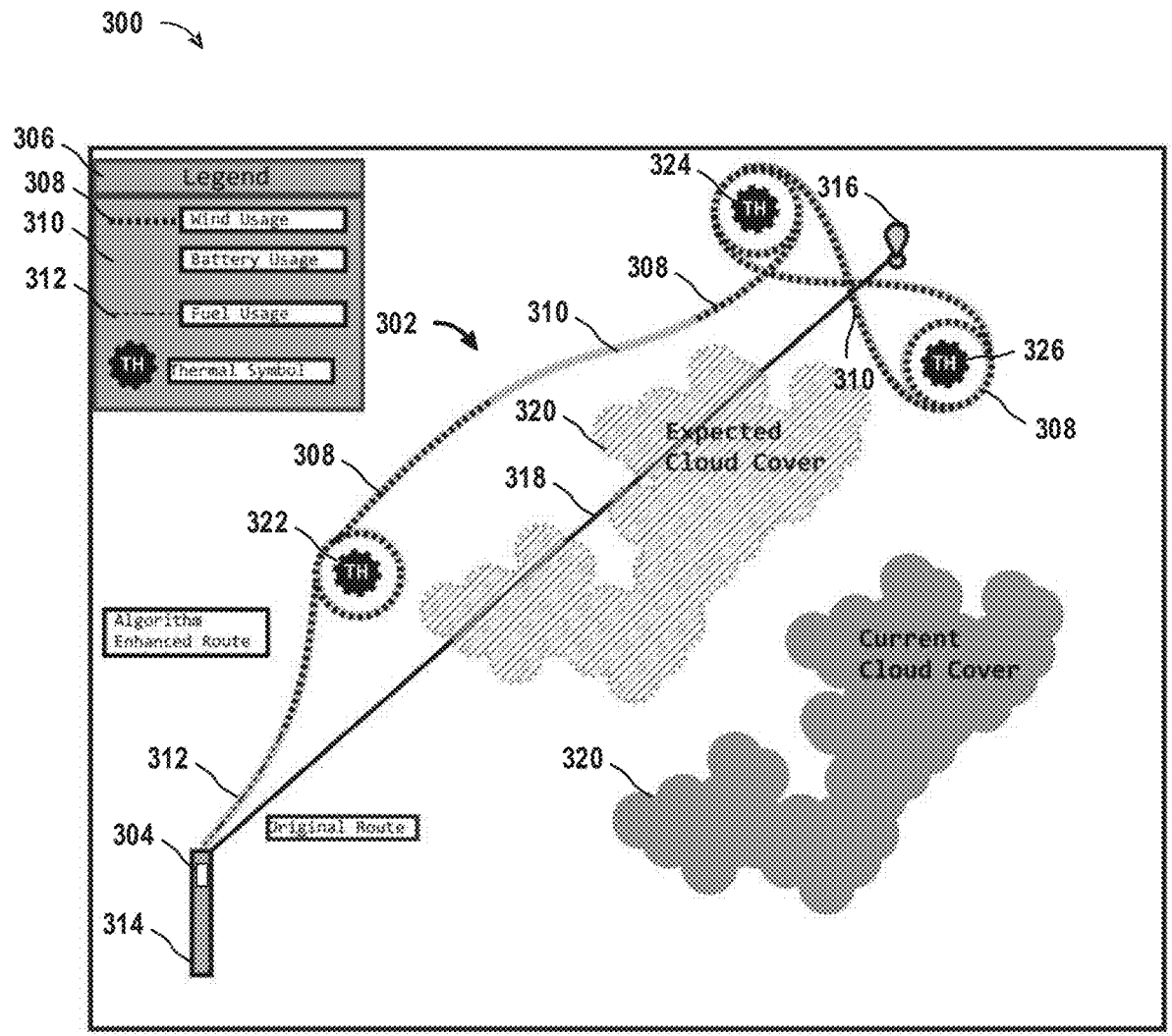
FIG. 3 is an example of a graphical illustration of an optimized flight route determined for an aerial vehicle.

FIG. 3 is an example of a graphical illustration 300 of an optimized flight route 302 determined for an aerial vehicle 304. The optimized flight route 302 can be determined by an FPO system, such as the FPO system 100, as shown in FIG. 1 or the FPO system 200, as shown in FIG. 2. Thus, the following description of FIG. 3 can also refer to FIGS. 1-2. The graphical illustration 300 includes a legend 306. The legend 306 includes a thermal symbol (labeled as "TH") representative of a thermal draft in an atmosphere, a thermal flight route segment 308, a solar flight route segment 310, and a fuel usage flight route segment 312. By way of example, the optimized flight route 302 for the aerial vehicle 304 can be determined while the aerial vehicle is located on an aerodrome or an airfield 314. As described herein the optimized flight route 302 can be constructed by associating each flight route segment, such as the thermal flight route segment 308, the solar flight route segment 310, and the fuel usage flight route segment 312 to produce the optimized flight route 302 for the aerial vehicle 304 for implementing a mission. For example, a task and/or objective of the mission is represented at 316 in the example graphical illustration 300 of FIG. 3.

In some examples, a user can define a flight route 318 for the aerial vehicle to use in implementing the mission. The FPO system can be configured to evaluate the user-defined flight route 318 to determine whether an optimized flight route exists for the aerial vehicle to use in implementing the mission. The FPO system can be configured to provide the optimized flight route 302 for the aerial vehicle. In some examples, as described herein, the FPO system can be configured to employ ML techniques to predict a movement of one or more clouds 320 from a first cloud location (at which the one or more clouds 320 can be referred to as "Current Cloud Cover" in the example of FIG. 3) to a second cloud location (at which the one or more clouds 320 can be referred to as "Expected Cloud Cover" in the example of FIG. 3), as shown in FIG. 3. The predicted movement of the clouds 320 can be employed to provide the optimized flight route 302 for the aerial vehicle for executing the mission, such that the aerial vehicle avoids the clouds 320, thereby maximizing an exposure of the vehicle to a solar source (e.g., the Sun). Moreover, the FPO system can be configured to enable the aerial vehicle to take advantage of a first thermal draft 322, a second thermal draft 324, and a third thermal draft 326 located in the atmosphere by maneuvering the aerial vehicle along the thermal flight route segments 308, such as shown in FIG. 3.

Figure 4:
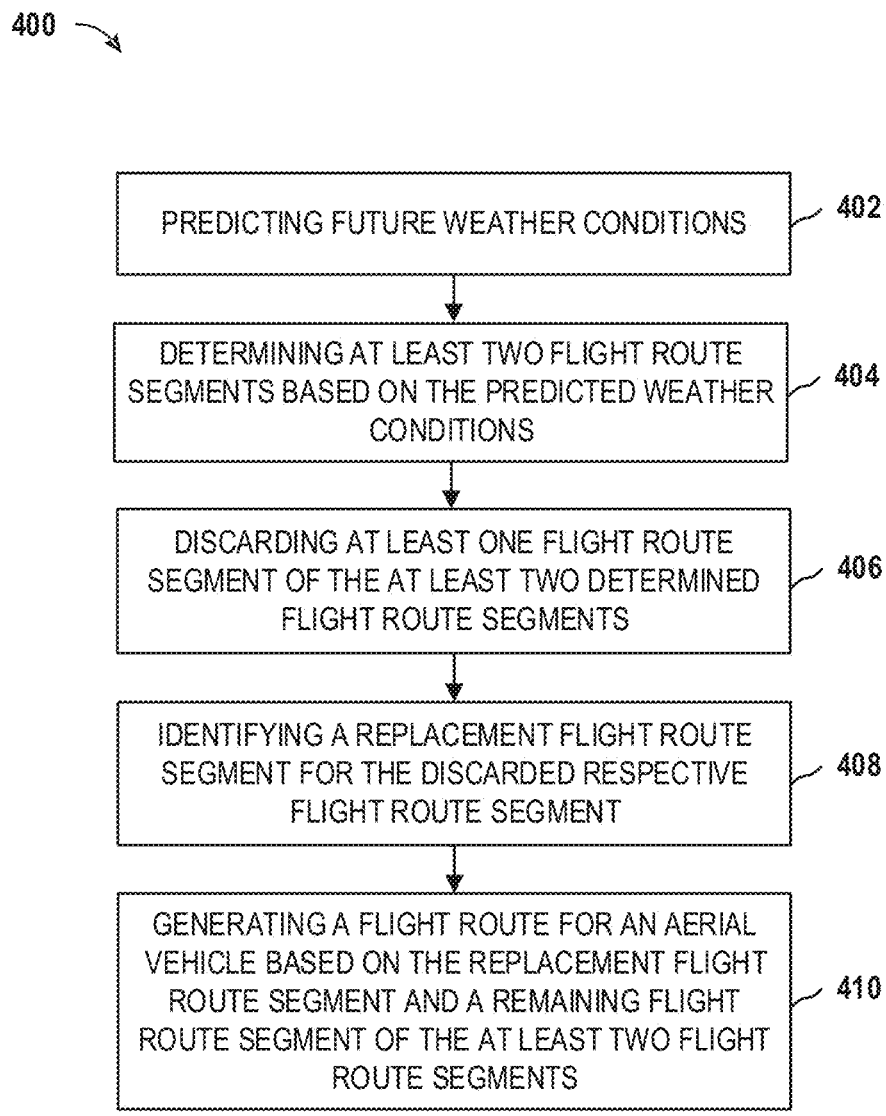
FIG. 4 is an example of a method for generating a flight route for an aerial vehicle.
Figure 5:
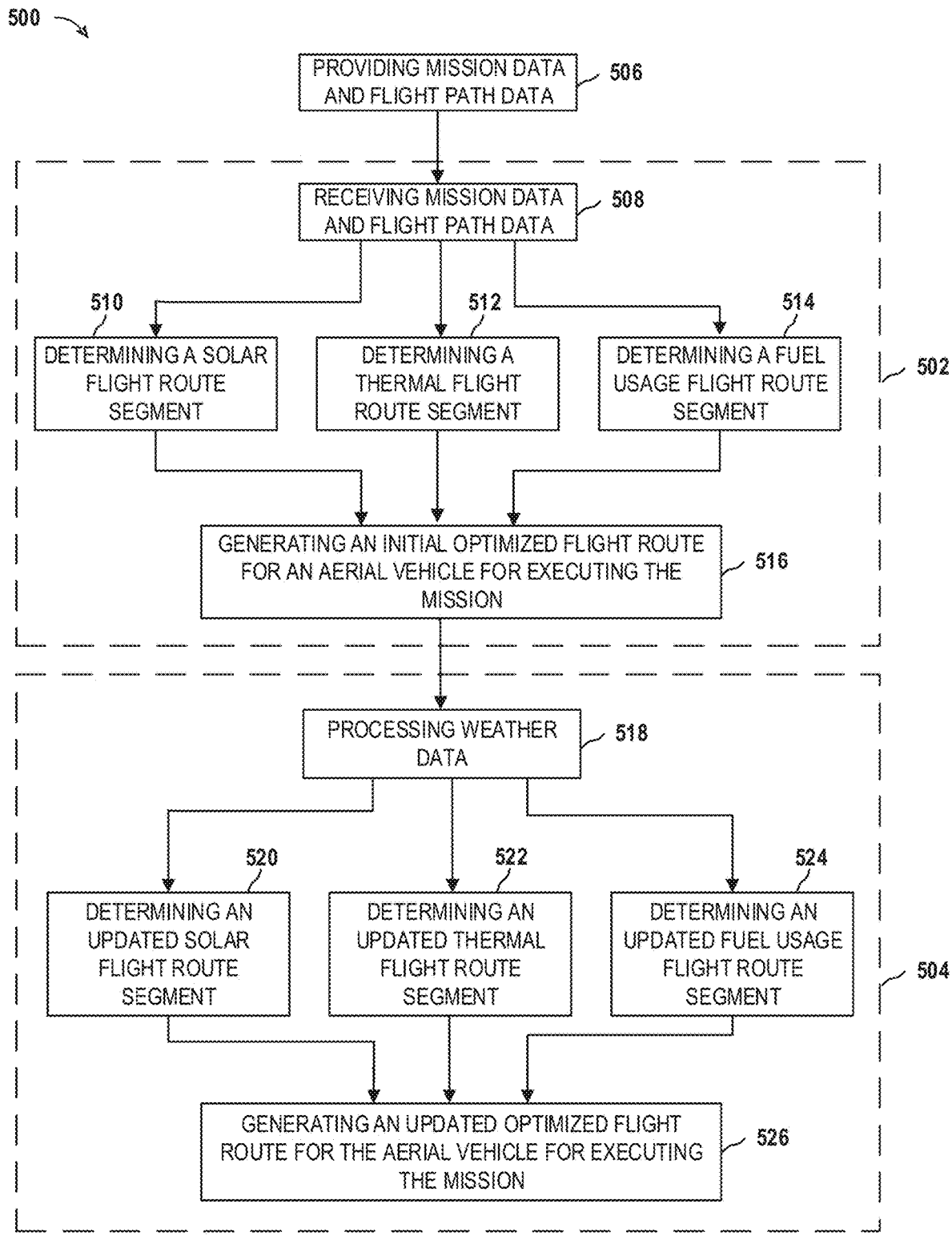
FIG. 5 is an example of a method for flight path optimization.
Figure 6:
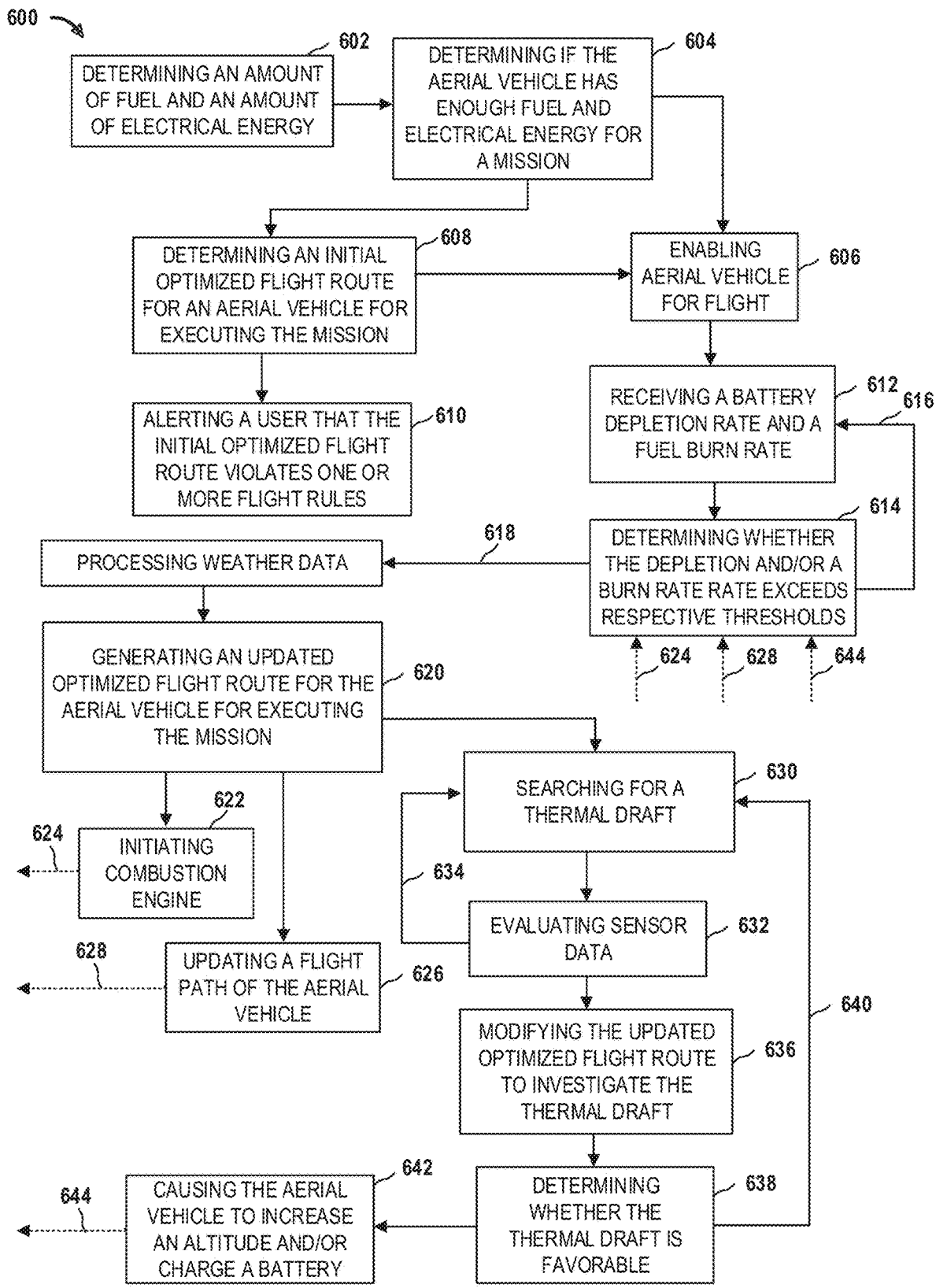
FIG. 6 is an example of a method for controlling an aerial vehicle during different phases of flight.

In view of the foregoing structural and functional features described above, an example method will be better appreciated with reference to FIGS. 4-6. While, for purposes of simplicity of explanation, the example methods of FIGS. 4-6 are shown and described as executing serially, it is to be understood and appreciated that the example methods are not limited by the illustrated order, as some actions could in other examples occur in different orders, multiple times and/or concurrently from that shown and described herein.

FIG. 4 is an example of a method 400 for generating a flight route for an aerial vehicle. The method 400 can be implemented by the FPO system 100 as shown in FIG. 1, or the FPO system 200, as shown in FIG. 2. Thus, the following description of FIG. 5 can also refer to FIGS. 1-3. The method 400 can begin at 402 by predicting (e.g., by the ML library 104, as shown in FIG. 1) weather conditions that an aerial vehicle (e.g., the aerial vehicle 304, as shown in FIG. 1) can experience during a flight based on weather data (e.g., the weather data 106, as shown in FIG. 1). At 404, at least two flight route segments can be determined (e.g., by the route determination algorithm 102, as shown in FIG. 1) based on the predicted weather data. In some examples, the at least two flight route segments can include one of a solar flight route segment and a thermal flight route segment. At 406, a respective flight route segment of the at least two flight route segments that would cause the aerial vehicle to violate a flight constraint during the flight can be discarded (e.g., by the route determination algorithm 102, as shown in FIG. 1). At 408, identifying a replacement flight route segment for the discarded respective flight route segment. At 410, generating a flight route (e.g., an optimized flight route) for the aerial vehicle based on the replacement flight route segment and a remaining flight route segment of the at least two flight route segments.

FIG. 5 is an example of a method 500 for flight path optimization. The method 500 can be implemented by the FPO system 100 as shown in FIG. 1, or the FPO system 200, as shown in FIG. 2. Thus, the following description of FIG. 5 can also refer to FIGS. 1-3. In some examples, the method 500 can include a pre-flight portion 502 and an in-flight portion 504. The pre-flight portion 502 can be implemented to determine an initial optimized flight route for an aerial vehicle (e.g., the aerial vehicle 304, as shown in FIG. 3) for completing a mission. The in-flight portion 504 can be implemented to adjust the initial optimized flight route for the aerial vehicle to update the optimized flight route for the aerial vehicle.

For example, the method 500 can begin at 506 by providing mission data (e.g., the mission data 208, as shown in FIG. 2) and flight route data (e.g., the flight route data 210, as shown in FIG. 2) for the aerial vehicle (e.g., a manned or an unmanned aerial vehicle). For example, a user can employ a user input device (e.g., the user input device 212, as shown in FIG. 2) to provide the mission data and the flight route data. At 508, a route determination module (e.g., the route determination module 206, as shown in FIG. 2) can be configured to receive or retrieve the mission data and flight path data. At 510, a solar flight route segment (e.g., the solar flight route segment 310, as shown in FIG. 3) can be determined (e.g., by the flight route segment identifier 214, as shown in FIG. 2). At 512, a thermal flight route segment (e.g., the thermal flight route segment 308, as shown in FIG. 3) can be determined (e.g., by the flight route segment identifier 214, as shown in FIG. 2). At 514, a fuel usage flight route segment (e.g., the fuel usage flight route segment 312, as shown in FIG. 3) can be determined (e.g., by the flight route segment identifier 214, as shown in FIG. 2). At 516, an initial optimized flight route for the aerial vehicle can be generated (e.g., by the flight route calculator 216, as shown in FIG. 2) for executing the mission based on the solar, thermal, and fuel usage flight route segments.

In some examples, such as during the flight of the aerial vehicle, the in-flight portion 504 of the method 500 can be implemented to adjust the initial optimized flight route for the aerial vehicle to update the optimized flight route for the aerial vehicle. For example, at 518, weather data (e.g., the weather data 224, as shown in FIG. 2) can be processed by the route determination module 206. In some examples, the route determination module can employ an ML module from an ML library (e.g., the ML library 220, as shown in FIG. 2) to predict weather conditions that the aerial vehicle is likely to experience during the execution of the mission. At 520, an updated solar flight route segment can be determined (by the flight route segment identifier 214, as shown in FIG. 2) based on predicted weather data (e.g., the predicted weather data 218, as shown in FIG. 2).

At 522, an updated thermal flight route segment can be determined (by the flight route segment identifier 214, as shown in FIG. 2) based on the predicted weather data. At 524, an updated fuel usage flight route segment can be determined (by the flight route segment identifier 214, as shown in FIG. 2) based on the predicted weather data. In some examples, at least one of the updated solar, thermal, or fuel usage flight route segments can be similar to the solar, thermal, or fuel usage flight route segments determined at 510, 512, or 514, respectively. At 526, an optimized flight route for the aerial vehicle can be generated (e.g., by the flight route calculator 216, as shown in FIG. 2) for executing the mission based on the updated solar, thermal, and fuel usage flight route segments. The optimized flight route can be used by the aerial vehicle to complete the mission.

FIG. 6 is an example of a method 600 for controlling an aerial vehicle during different phases of flight. The method 600 can be implemented by the FPO system 100 as shown in FIG. 1, or the FPO system 200, as shown in FIG. 2. Thus, the following description of FIG. 5 can also refer to FIGS. 1-5. The method 600 can begin at 602, by determining (e.g., at a route determination module 206, as shown in FIG. 2) a current amount of fuel within a fuel tank of an aerial vehicle (e.g., the aerial vehicle 304, as shown in FIG. 3) based on fuel data (e.g., the fuel data 250, as shown in FIG. 2). In some examples, at 602, an amount of electrical energy stored at a battery of the aerial vehicle can be determined (e.g., by the route determination module 206, as shown in FIG. 2).

At 604, a determination can be made whether the aerial vehicle has enough fuel in the fuel tank and electrical energy stored at the battery of the aerial vehicle to execute a mission. For example, the route determination module can be configured to evaluate the current amount of fuel relative to a fuel threshold and the current amount of electrical energy relative to an electrical energy threshold. If the fuel tank has enough fuel and the battery has enough electrical energy stored, the method 600 can proceed to 606. For example, if the current amount of fuel in the fuel tank is greater than or equal to the fuel threshold, and the current amount of electrical energy stored at the battery is greater than or equal to the electrical energy threshold, the method 600 can proceed to 606. At 606, the route determination module can be programmed to provide an alert (e.g., to a user that the aerial vehicle is ready for take-off) or cause a control system of the aerial vehicle to initiate a take-off of the aerial vehicle.

In some examples, if the current amount of fuel in the fuel tank is less than the fuel threshold, and/or the amount of electrical energy stored in the battery is less than the electrical energy threshold, the method 600 can proceed to 608. At 608, an initial optimized flight route for the aerial vehicle for executing the mission can be determined (e.g., by the route determination module 206, as shown in FIG. 2) as described herein. In response to determining the initial optimized flight for the aerial vehicle, the method 600 can proceed to 606. In some examples, if the initial optimized flight is determined to violate the flight constraint, the method can 600 can be terminated at 610. For example, at 610 a user can be alerted (e.g., by the route determination module 206, as shown in FIG. 2) to notify the user that the aerial vehicle will not be implementing the mission.

In some examples, such as during flight of the aerial vehicle, at 612, a battery depletion rate of the battery and/or a fuel burn rate of the combustion engines of the aerial vehicle can be retrieved or requested (e.g., by the route determination module 206, as shown in FIG. 2). At 614, the battery depletion rate of the battery and/or the fuel burn rate of the combustion engines can be evaluated relative to a battery depletion rate threshold and a fuel burn rate threshold, respectively. In some examples, the method 600 can proceed at 616 to 612 in response to determining that the battery depletion rate of the battery is less than the battery depletion rate threshold and that the fuel burn rate of the combustion engines of the aerial vehicle is less than the fuel burn rate threshold. At 612, an updated battery depletion rate of the battery and updated fuel burn rate for the combustion engines of the aerial vehicle can be requested or retrieved. In some examples, the method 600 can proceed to 618 in response to determining that the battery depletion rate of the battery is greater than or equal to the battery depletion rate threshold and/or that the fuel burn rate of the combustion engines of the aerial vehicle is greater than or equal to the fuel burn rate threshold. For example, at 618, weather data (e.g., the weather data 224, as shown in FIG. 2) can be processed by the route determination module. In some examples, the route determination module can employ an ML module from an ML library (e.g., the ML library module 220, as shown in FIG. 2) to predict weather conditions that the aerial vehicle is likely to experience during execution of the mission. At 620, an updated optimized flight route for the aerial vehicle can be generated (e.g., by the flight route calculator 216, as shown in FIG. 2).

In some examples, during the flight of the aerial vehicle along a respective flight route segment of the optimized flight route, at 622, at least one combustion engine of the aerial vehicle can be initiated (e.g., by the route determination module 206, as shown in FIG. 2). At 624, the method 600 can proceed to 614 to evaluate the battery depletion rate and the fuel burn rate for determining a new optimized flight route as described herein. Based on the evaluation at 614, the optimized flight route for the aerial vehicle for executing the mission can be updated. In some examples, during the flight of the aerial vehicle along the respective flight route segment of the updated optimized flight route, at 626, a new flight segment can be requested to reduce a power exertion of the aerial vehicle (e.g., excessive depletion of the battery). At 628, the method 600 can proceed to 614 to evaluate the battery depletion rate and the fuel burn rate for determining a new optimized flight route as described herein.

In some examples, during the flight of the aerial vehicle along the respective flight route segment of the updated optimized flight route, at 630, a search for a thermal draft at a first location in an atmosphere can be implemented (e.g., by the thermal detector 258, as shown in FIG. 2). At 632, sensor data (e.g., the image data 262, the radar data 264, and/or the lidar data 266), as shown in FIG. 2) can be evaluated. The method 600 can proceed to 630 at 634 to continue searching for the thermal draft based on the evaluation of the sensor data indicating that no thermal draft is present at the first location in the atmosphere. At 630, the search for the thermal draft at a second location in the atmosphere can be implemented.

At 632, the sensor data can be evaluated (e.g., by the thermal detector 258, as shown in FIG. 2) and the method 600 can proceed to 636 in response to detecting the thermal draft at the second location in the atmosphere based on the sensor data. At 636, the updated optimized flight route can be modified (e.g., by the route determination module 206, as shown in FIG. 2) to cause the aerial vehicle to maneuver to the second location in the atmosphere at which the thermal updraft can be located. At 638, the thermal draft can be evaluated (e.g., by the thermal detector 258, as shown in FIG. 2) to determine whether the thermal draft is a favorable thermal draft. The method 600 can proceed to 630 at 640 in response to determining that the thermal draft is unfavorable (e.g., by the thermal detector 258, as shown in FIG. 2). In some examples, the method 600 can proceed to 642 in response to determining that the thermal draft is favorable. At 642, the aerial vehicle can be caused to utilize the thermal draft to increase an altitude of the aerial vehicle and/or charge the battery of the aerial vehicle. At 644, the method 600 can proceed to 614 to evaluate the battery depletion rate and the fuel burn rate for determining a new optimized flight route as described herein.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A computed implemented method comprising:
    predicting weather conditions for an aerial vehicle during flight based on weather data received from a machine learning (ML) library;
    determining at least two flight route segments based on the predicted weather data, wherein the at least two flight route segments include one of a solar flight route segment and a thermal flight route segment;
    discarding a respective flight route segment of the at least two flight route segments that cause the aerial vehicle to violate a flight constraint;
    determining a replacement flight route segment for the respective discarded flight route segment;
    generating a flight route for the aerial vehicle based on the replacement flight route segment and at least one remaining flight route segment of the at least two flight route segments, wherein the flight route is an optimized flight route that increases a likelihood that the aerial vehicle during the flight is exposed to a thermal draft;
    causing the aerial vehicle, when the aerial vehicle is being maneuvered with respect to the optimized flight route, to maneuver toward a destination and to implement a mission to search for the thermal draft by evaluating captured sensor data from at least one of a radar system, a lidar system and an image system characterizing an area or a location in an atmosphere;
    determining that the thermal draft is present at the area or the location in the atmosphere, based on the captured sensor data;
    evaluating a rate at which the aerial vehicle is caused to increase a respective altitude in response to the thermal draft being detected relative to an altitude rate threshold;
    predicting an amount of electrical power that is likely to be generated by an electrical generator in response to the thermal draft relative to a thermal electrical power generation threshold based on the weather data; and
    causing the aerial vehicle to enter the area or the location in the atmosphere at which the thermal draft is present in response to determining that the predicted amount of electrical power likely to be generated exceeds the power generation threshold.

2. The computer implemented method of claim 1, wherein the flight route for the aerial vehicle is further generated based on at least one user-defined flight route segment of a user defined flight route.

3. The computer implemented method of claim 2, wherein the generating comprises associating each flight route segment with at least one other flight route segment to provide the flight route for the aerial vehicle.

4. The computer implemented method of claim 3, wherein the respective flight route segment that is discarded is a first flight route segment, and the method further comprising predicting a power consumption of electrical engines of the aerial vehicle during a second flight route segment of the at least two flight route segments.

5. The computer implemented method of claim 4, further comprising discarding the second flight route segment in response to determining that the predicted power consumption of the electrical engines of the aerial vehicle during the second flight route segment is greater than or equal to a power consumption threshold.

6. The computer implemented method of claim 3, wherein the respective flight route segment that is discarded is a first flight route segment, and the method further comprising predicting a fuel burn rate of combustion engines of the aerial vehicle during a second flight route segment of the at least two flight route segments.

7. The computer implemented method of claim 6, further comprising discarding the second flight route segment in response to determining that the predicted fuel burn rate of the combustion engines of the aerial vehicle during the second flight route segment is greater than or equal to a fuel burn rate threshold.

8. The computer implemented method of claim 3, wherein the respective flight route segment that is discarded is a first flight route segment, and the method further comprising predicting a battery depletion rate of a battery of the aerial vehicle during a second flight route segment of the at least two flight route segments.

9. The computer implemented method of claim 8, further comprising discarding the second flight route segment in response to determining that the predicted battery depletion rate of the battery of the aerial vehicle during the second flight route segment is greater than or equal to a battery depletion rate threshold.

10. The computer implemented method of claim 9, wherein the respective flight route segment that is discarded is a first flight route segment, and the method further comprising predicting a power generation rate of an electrical generator of the aerial vehicle during a second flight route segment of the at least two flight route segments.

11. The computer implemented method of claim 10, further comprising discarding the second flight route segment in response to determining that the predicted power generation rate of the electrical generator of the aerial vehicle during the second flight route segment is less than or equal to the power generation threshold.

12. The computer implemented method of claim 3, further comprising:
generating engine control data for controlling an operational state of at least one combustion and/or electrical engine during each flight route segment of the optimized flight route, wherein the operational state comprises an enabled state and a disabled state; and
causing the engine control data to be provided to a vehicle control system of the aerial vehicle to cause the operational state of the at least one combustion and/or electrical engine to be set based on a respective flight route segment of the optimized flight route.

13. A system comprising:
memory to store machine-readable instructions and data comprising user-defined flight route data characterizing a user-defined flight for an aerial vehicle;
one or more processors to access the memory and execute the machine-readable instructions, the machine-readable instructions being executable by the one or more processors to perform operations comprising:
determining flight route segments based on predicted weather conditions for the aerial vehicle during flight, wherein the flight route segments comprise a solar flight route segment and a thermal flight route segment;
determining whether to discard a respective flight route segment of the flight route segments based on a flight constraint and an evaluation of a predicted engine condition relative to a predicted engine threshold;
determining a replacement flight route segment in response to determining that the respective flight route segment is to be discarded based on the predicted weather conditions; and
generating an optimized flight route for the aerial vehicle based on the replacement flight route segment and remaining flight route segments of the flight route segments, and further based on at least one user-defined flight route segment of the user-defined flight route;
providing the predicted weather conditions for the aerial vehicle during flight based on current weather data, and providing the predicted engine condition based on fuel data characterizing a fuel burn rate of at least one combustion engine of the aerial vehicle and electrical data characterizing a power consumption rate of at least one electrical engine of the aerial vehicle, wherein the flight route is an optimized flight route that increases a likelihood that the aerial vehicle during the flight is exposed to a thermal draft;
causing the aerial vehicle, when the aerial vehicle is being maneuvered with respect to the optimized flight route, to maneuver toward a destination and to implement a mission to search for the thermal draft by evaluating captured sensor data from at least one of a radar system, a lidar system and an image system characterizing an area or a location in an atmosphere;
determining that the thermal draft is present at the area or the location in the atmosphere, based on the captured sensor data;
evaluating a rate at which the aerial vehicle is caused to increase a respective altitude in response to the thermal draft being detected relative to an altitude rate threshold;
predicting an amount of electrical power that is likely to be generated by an electrical generator in response to the thermal draft relative to a thermal electrical power generation threshold based on the weather data; and
causing the aerial vehicle to enter the area or the location in the atmosphere at which the thermal draft is present in response to determining that the predicted amount of electrical power likely to be generated exceeds the power generation threshold.

14. The system of claim 13, wherein operations performed by the one or more processors executing the machine-readable instructions further comprise:
generating engine control data to control an operational state of the at least one combustion and/or electrical engine during each flight route segment of the optimized flight route, wherein the operational state comprises an enabled state and a disabled state, the vehicle engine manager being programmed to communicate the engine control data to a vehicle control system of the aerial vehicle to cause the operational state of the at least one combustion and/or electrical engine to be set based on a respective flight route segment of the optimized flight route.

15. The system of claim 14, wherein operations performed by the one or more processors executing the machine-readable instructions further comprise:
predicting the weather conditions for the aerial vehicle during flight based on the current weather data;
predicting an amount of power consumed by the at least one electrical engine of the aerial vehicle during the respective flight route segment based on the predicted weather conditions and the electrical data;
predicting a fuel burn rate of the at least one combustion engine of the aerial vehicle during the respective flight route segment based on the predicted weather conditions and the fuel data, and
wherein the predicted engine condition comprises the predicted amount of power consumed by the at least one electrical engine and the predicted fuel burn rate of at least one combustion engine, and the determining of whether to discard the respective flight route segment of the flight route segments is further based on an evaluation of each of the predicted amount of power consumed by the at least one electrical engine and the predicted fuel burn rate of at least one combustion engine relative to a corresponding threshold.

16. The system of claim 15, wherein the respective flight route segment is discarded and is a first flight route segment, wherein operations performed by the one or more processors executing the machine-readable instructions further comprise:
forecasting a battery depletion rate of a battery of the aerial vehicle during a second flight route segment based on the predicted weather conditions; and
predicting an amount of power that is likely to be generated by an electrical generator of the aerial vehicle during a second flight route segment based on the predicted weather conditions, discarding the second flight route segment based on an evaluation of one the forecasted battery depletion rate of the battery being greater than or equal to a battery depletion rate threshold, and the predicted amount of power being less than or equal to the power generation threshold.

\* \* \* \* \*